United States Patent
Ono

(10) Patent No.: US 10,191,337 B2
(45) Date of Patent: Jan. 29, 2019

(54) LIQUID CRYSTAL DISPLAY DEVICE

(71) Applicant: Panasonic Liquid Crystal Display Co., Ltd., Himeji-shi, Hyogo (JP)

(72) Inventor: Kikuo Ono, Ibaraki (JP)

(73) Assignee: Panasonic Liquid Crystal Display Co., Ltd., Hyogo (JP)

(*) Notice: Subject to any disclaimer, the term of this patent is extended or adjusted under 35 U.S.C. 154(b) by 0 days.

(21) Appl. No.: 15/707,666

(22) Filed: Sep. 18, 2017

(65) Prior Publication Data

US 2018/0081228 A1    Mar. 22, 2018

(30) Foreign Application Priority Data

Sep. 21, 2016 (JP) ................... 2016-183831

(51) Int. Cl.
| | | |
|---|---|---|
| G02F 1/1347 | (2006.01) |
| G02F 1/1335 | (2006.01) |
| G09G 3/34 | (2006.01) |
| G09G 3/36 | (2006.01) |
| G02F 1/1343 | (2006.01) |

(52) U.S. Cl.
CPC .... *G02F 1/13471* (2013.01); *G02F 1/133528* (2013.01); *G02F 1/133602* (2013.01); *G02F 1/134336* (2013.01); *G09G 3/3406* (2013.01); *G09G 3/3611* (2013.01); *G09G 2300/023* (2013.01); *G09G 2300/0439* (2013.01)

(58) Field of Classification Search
CPC .. G09G 23/023; G02F 1/1347; G02F 1/13471
See application file for complete search history.

(56) References Cited

U.S. PATENT DOCUMENTS

| | | | |
|---|---|---|---|
| 2007/0063925 A1 | 3/2007 | Yoshihara et al. | |
| 2009/0147186 A1* | 6/2009 | Nakai | G02F 1/13471 349/74 |
| 2011/0261268 A1 | 10/2011 | Nakai et al. | |

FOREIGN PATENT DOCUMENTS

| | | |
|---|---|---|
| JP | 2015-197578 | 11/2015 |
| WO | 2007/040127 | 4/2007 |

OTHER PUBLICATIONS

Search Report issued in International Application No. PCT/JP2017/033571, dated Nov. 14, 2017, 3 pages with translation.
Office Action issued in corresponding U.S. Appl. No. 15/707,711, dated Jun. 28, 2018, 9 pages.

* cited by examiner

*Primary Examiner* — Thanh-Nhan P Nguyen
(74) *Attorney, Agent, or Firm* — Hamre, Schumann, Mueller & Larson, P.C.

(57) ABSTRACT

A liquid crystal display device includes: a first display panel displaying a color image, and a second display panel displaying a black-and-white image. The first display panel includes a first pixel corresponding to a first transmission area transmitting light having first color, a second pixel corresponding to a second transmission area transmitting light having second color, and a third pixel corresponding to a third transmission area transmitting light having third color. The second display panel includes a fourth pixel overlapping the first pixel, and a fifth pixel overlapping the second pixel and the third pixel. An area of the fourth pixel is different from an area of the fifth pixel.

15 Claims, 35 Drawing Sheets

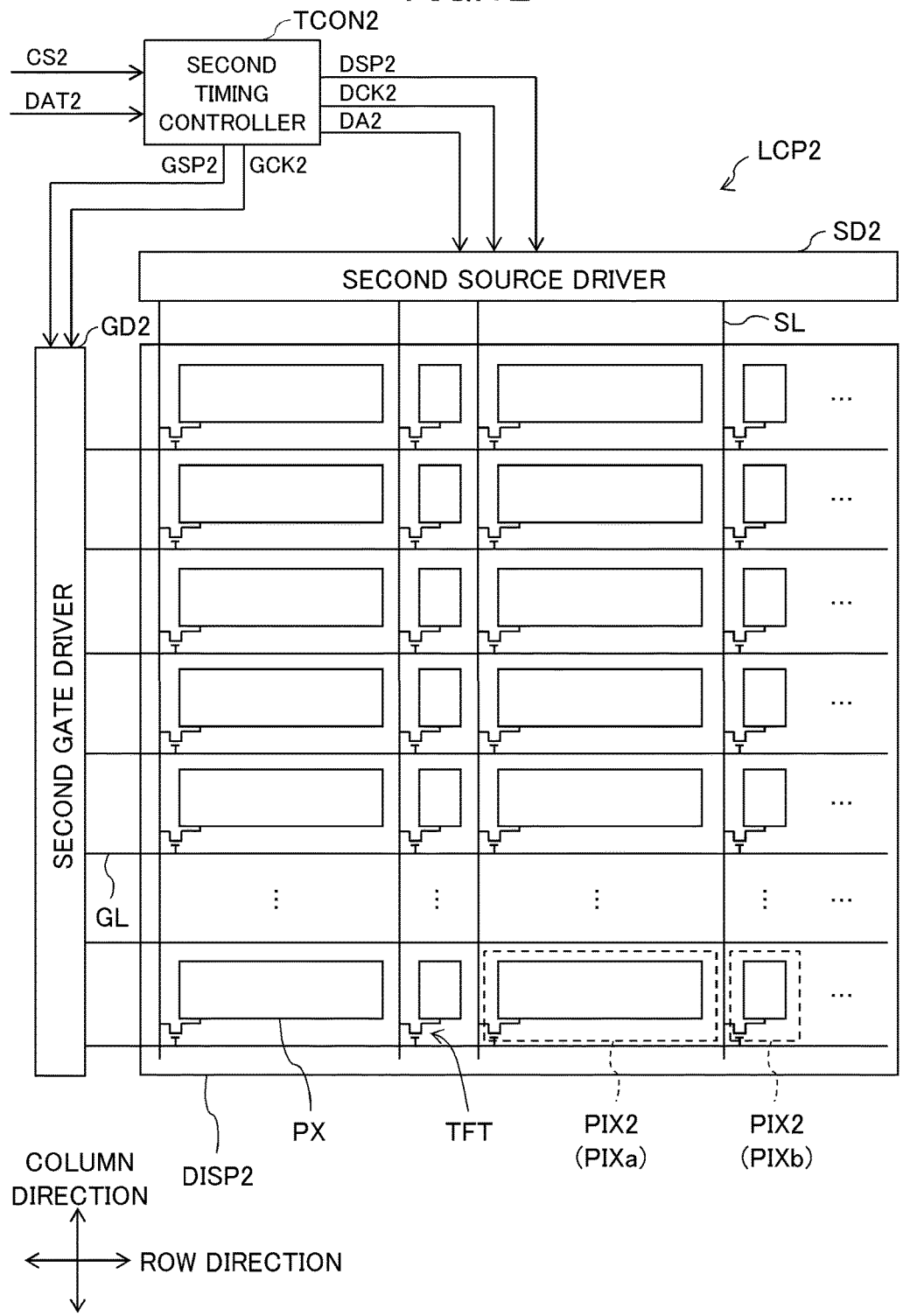

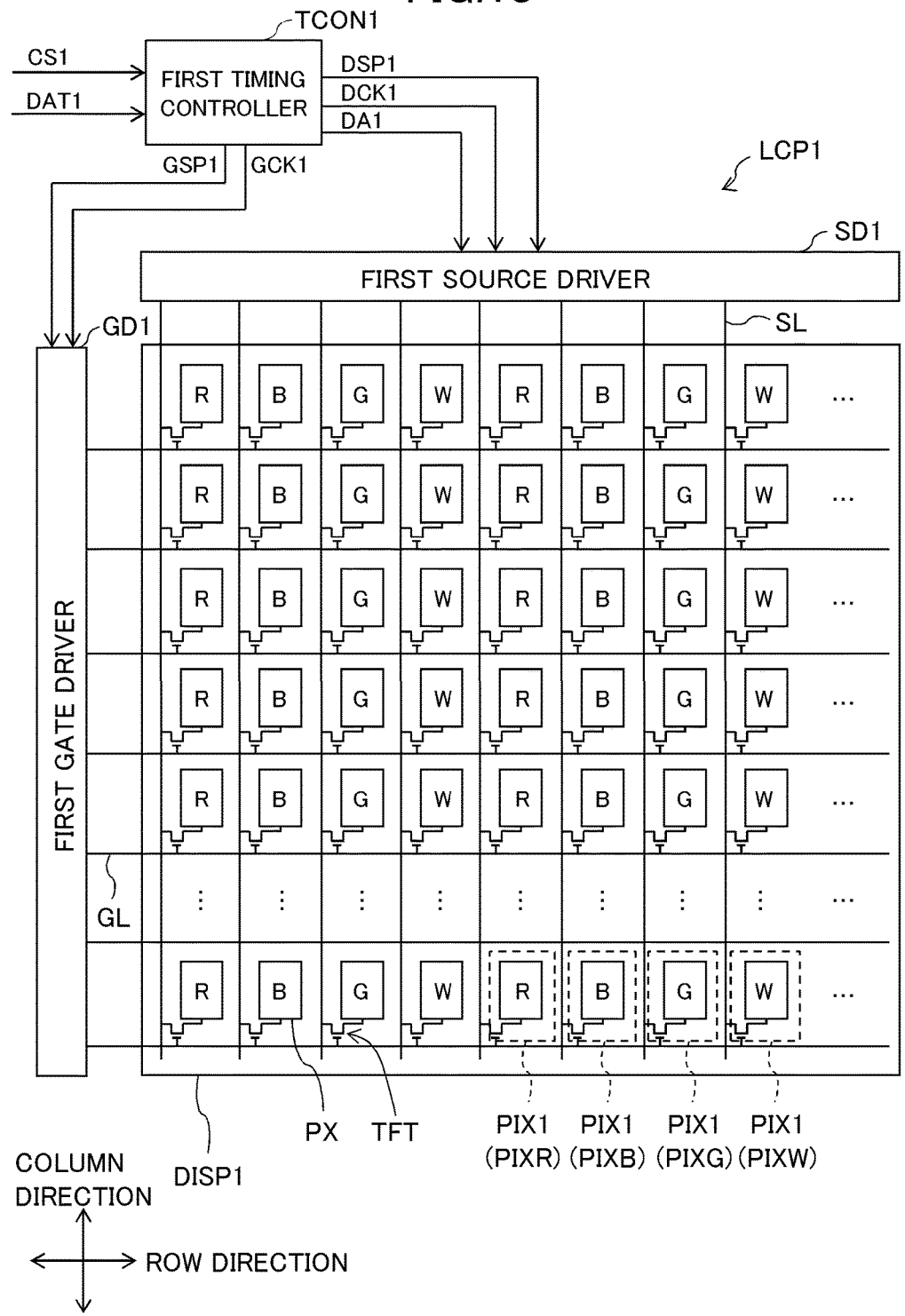

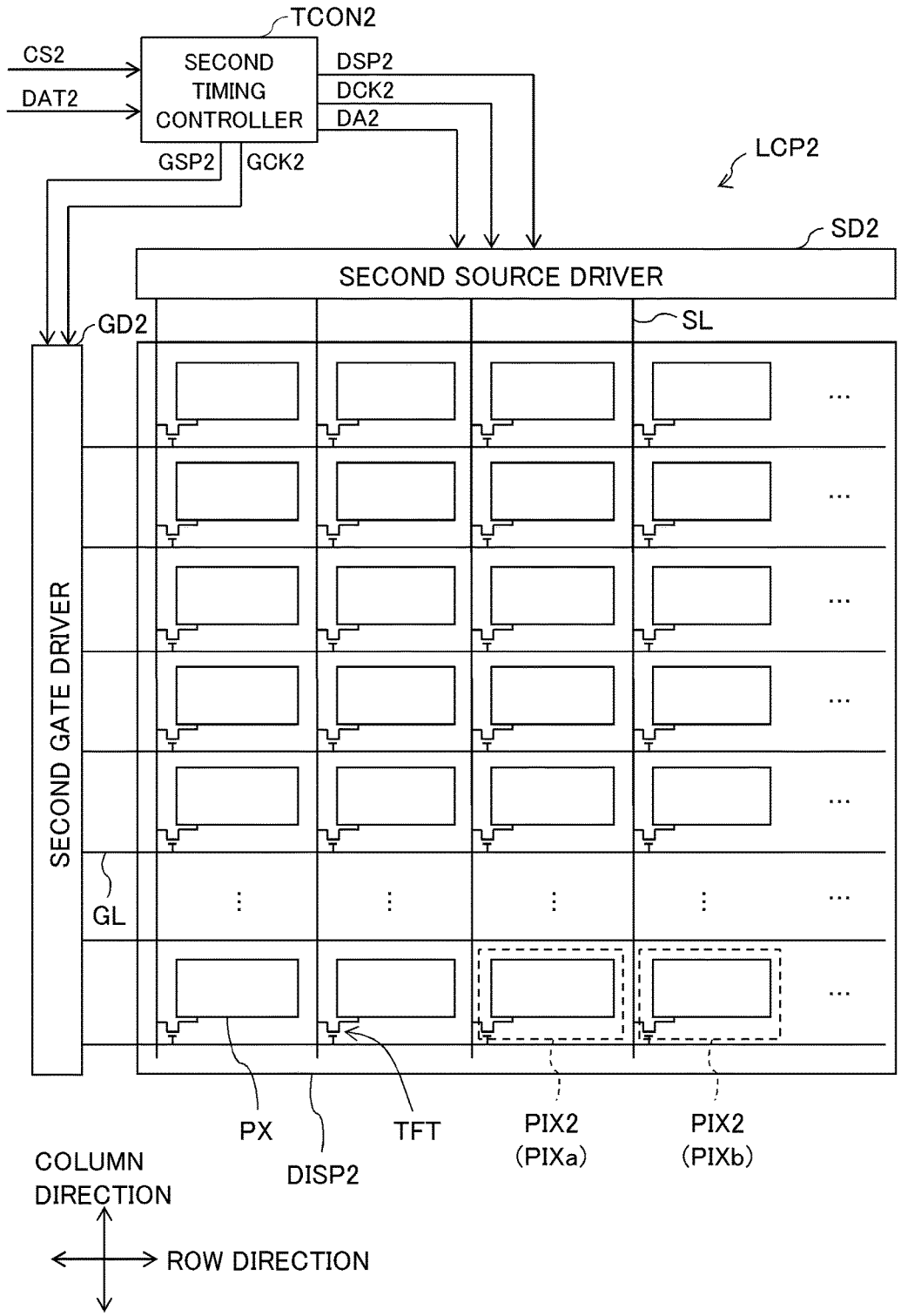

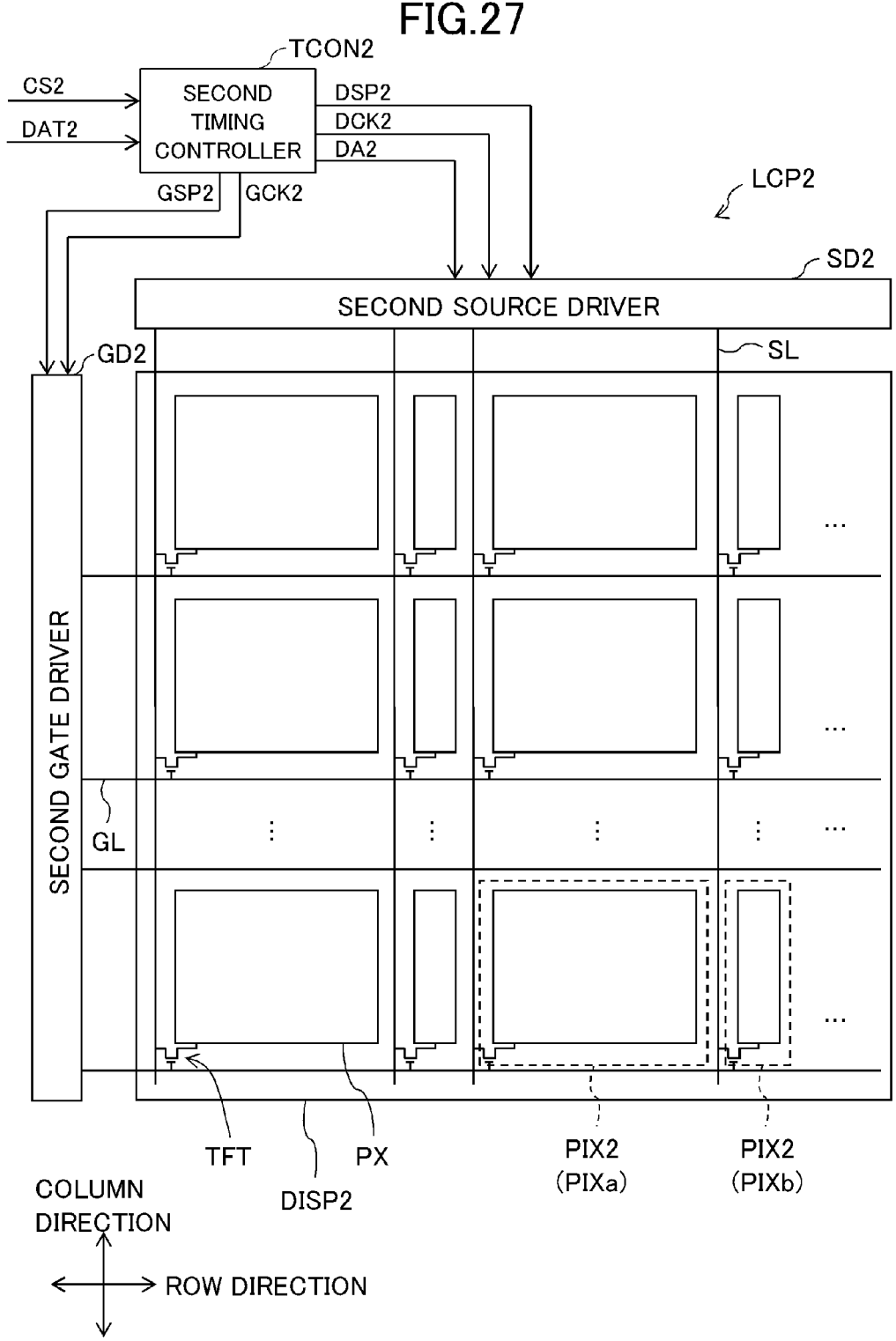

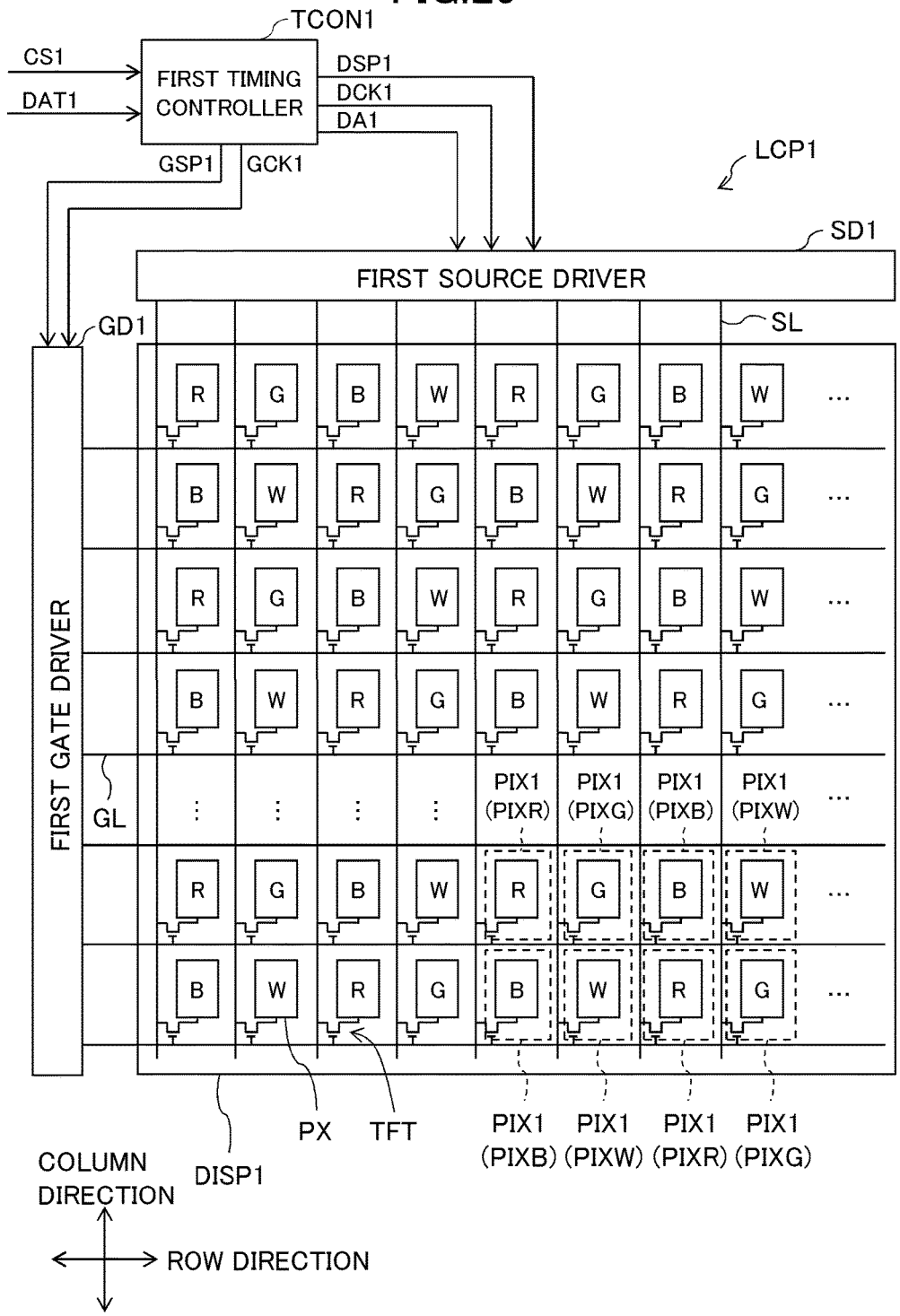

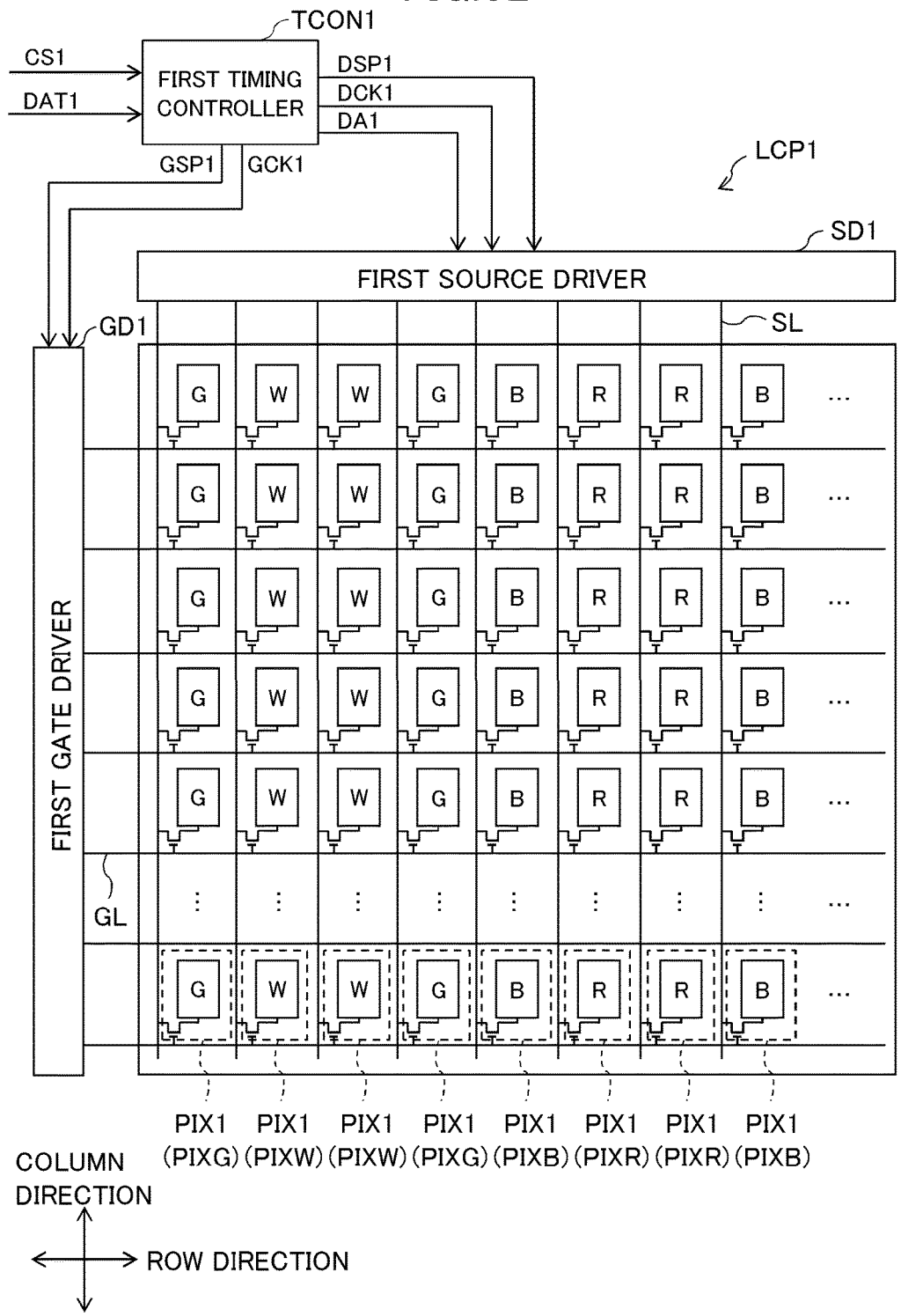

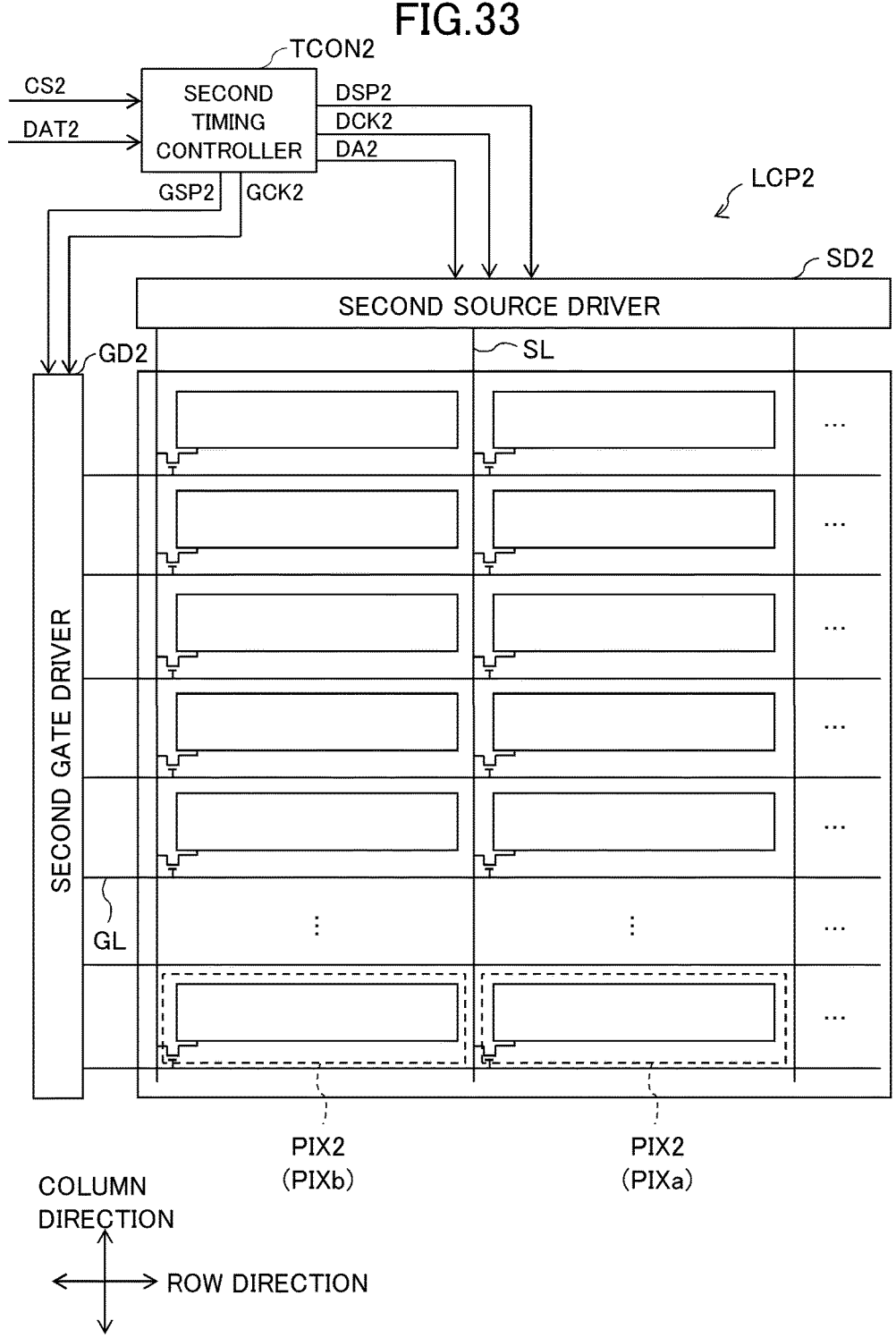

LIQUID CRYSTAL DISPLAY DEVICE

CROSS-REFERENCE TO RELATED APPLICATION

This application claims priority from Japanese application JP 2016-183831, filed Sep. 21, 2016. This Japanese application is incorporated herein by reference.

TECHNICAL FIELD

The present invention relates to a liquid crystal display device.

BACKGROUND

A technology, in which two display panels overlap each other and an image is displayed on each display panel based on an input video signal, is conventionally proposed to improve contrast of a liquid crystal display device (for example, see WO2007/040127). Specifically, for example, a color image is displayed on a front-side (observer-side) display panel in two display panels disposed back and forth, and a black-and-white image is displayed on a rear-side (backlight-side) display panel, thereby improving contrast. In the liquid crystal display device, to decrease the number of source drivers for a purpose of cost reduction, one pixel of a black-and-white image display panel is disposed with respect to three pixels (a red pixel, a green pixel, a blue pixel) of a color image display panel.

SUMMARY

In the case that a monochrome image is displayed on a normal liquid crystal display device constructed with one color image display panel, it is known that color reproducibility is degraded by leakage light from a pixel different from a pixel transmitting true color. For example, in the case that a blue monochrome image is displayed, light leakage occurs partially from an off-state red pixel and an off-state green pixel due to, for example, scattering, and the leakage light is mixed with blue light, there by degrading the color reproducibility of a blue image. Particularly, in the case that a low-luminance monochrome image is displayed, the color reproducibility is degraded because an influence of the leakage light increases. The same holds true for a liquid crystal display device disclosed in WO2007/040127. In the above-described liquid crystal display device, even if the monochrome image is displayed, a red pixel, a green pixel, and a blue pixel of the color image display panel are evenly irradiated with a backlight beam transmitted through a black-and-white image display panel. Therefore, the color reproducibility may be degraded due to the light leakage similarly to the normal liquid crystal display device.

The present disclosure is made in consideration of such a situation, and an object of the present disclosure is to improve the color reproducibility of the monochrome image in a liquid crystal display device in which the plurality of display panels overlap each other.

To solve the above problem, a liquid crystal display device according to a first disclosure in which a plurality of display panels are overlapping each other, comprises: a first display panel that displays a color image, the first display panel including a plurality of transmission sections each of which transmits light having a predetermined color; and a second display panel that displays a black-and-white image, wherein each of the first display panel and the second display panel includes a plurality of pixels, the plurality of pixels being defined by two source lines adjacent to each other and two gate lines adjacent to each other in plan view, the plurality of pixels of the first display panel include a first pixel corresponding to a first transmission section transmitting light having first color, a second pixel corresponding to a second transmission section transmitting light having second color, and a third pixel corresponding to a third transmission section transmitting light having third color, the plurality of pixels of the second display panel include a fourth pixel (PIXb) overlapping the first pixel and a fifth pixel (PIXa) overlapping the second pixel and the third pixel, and an area of the fourth pixel is different from an area of the fifth pixel.

In the liquid crystal display device according to the first disclosure, the area of the fourth pixel may be equal to an area of the first pixel, and the area of the fifth pixel may be equal to or larger than a total area of the second pixel and the third pixel.

In the liquid crystal display device according to the first disclosure, the first display panel may further include a sixth pixel corresponding to a fourth transmission section transmitting light having fourth color, the first transmission section may transmit white light, and the fifth pixel (PIXa) may overlap the second pixel (R), the third pixel (G), and the sixth pixel (B).

In the liquid crystal display device according to the first disclosure, the area of the fourth pixel may be equal to an area of the first pixel, and the area of the fifth pixel may be equal to a total area of the second pixel, the third pixel, and the sixth pixel.

In the liquid crystal display device according to the first disclosure, the first transmission section may transmit green, yellow, or white light, and the fourth pixel (PIXb) may overlap a plurality of the first pixels (G or W) adjacent to each other in at least one of a first direction in which the source lines extend and a second direction in which the gate lines extend.

To solve the above problem, a liquid crystal display device according to a second disclosure in which a plurality of display panels are overlapping each other, comprises: a first display panel that displays a color image, the first display panel including a plurality of transmission sections each of which transmits light having a predetermined color; and a second display panel that displays a black-and-white image, wherein each of the first display panel and the second display panel includes a plurality of pixels, the plurality of pixels being defined by two source lines adjacent to each other and two gate lines adjacent to each other in plan view, the plurality of pixels of the first display panel include a first pixel corresponding to a first transmission section transmitting light having first color, a second pixel corresponding to a second transmission section transmitting light having second color, a third pixel corresponding to a third transmission section transmitting light having third color, and a fourth pixel corresponding to a fourth transmission section transmitting light having fourth color, the plurality of pixels of the second display panel include a fifth pixel (PIXb) overlapping the first pixel (G) and the second pixel (W) and a sixth pixel (PIXa) overlapping the third pixel (R) and the fourth pixel (B), an area of the fifth pixel is smaller than a total area of the first pixel, the second pixel, the third pixel and the fourth pixel, and an area of the sixth pixel is smaller than a total area of the first pixel, the second pixel, the third pixel and the fourth pixel.

In the first display panel of the liquid crystal display device according to the second disclosure, the first pixel (G)

and the second pixel (W) may be arrayed adjacent to each other in a first direction in which the source lines extend or a second direction in which the gate lines extend.

To solve the above problem, a liquid crystal display device according to a third disclosure in which a plurality of display panels are overlapping each other, comprises: a first display panel that displays a color image, the first display panel including a plurality of transmission sections each of which transmits light having a predetermined color; and a second display panel that displays a black-and-white image, wherein each of the first display panel and the second display panel includes a plurality of pixels, the plurality of pixels being defined by two source lines adjacent to each other and two gate lines adjacent to each other in plan view, the plurality of pixels of the first display panel include a first pixel corresponding to a first transmission section transmitting light having first color, a second pixel corresponding to a second transmission section transmitting light having second color, a third pixel corresponding to a third transmission section transmitting light having third color, and a fourth pixel corresponding to a fourth transmission section transmitting light having fourth color, a first pixel group including the two first pixels (G) and the two second pixels (W) and a second pixel group including the two third pixels (R) and the two fourth pixels (B) are arrayed adjacent to each other, and the plurality of pixels of the second display panel include a fifth pixel (PIXb) overlapping the first pixel group and a sixth pixel (PIXa) overlapping the second pixel group.

In the liquid crystal display device according to the second or third disclosure, each of the first transmission section and the second transmission section may transmit green, yellow, or white light.

In the liquid crystal display device according to the second or third disclosure, the area of the fifth pixel may be equal to the area of the sixth pixel.

To solve the above problem, a liquid crystal display device according to a fourth disclosure in which a plurality of display panels are overlapping each other, comprises: a first display panel that displays a color image, the first display panel including a plurality of transmission sections each of which transmits light having a predetermined color; and a second display panel that displays a black-and-white image, wherein each of the first display panel and the second display panel includes a plurality of pixels, the plurality of pixels being defined by two source lines adjacent to each other and two gate lines adjacent to each other in plan view, the plurality of pixels of the first display panel include a first pixel corresponding to a first transmission section transmitting light having first color, a second pixel corresponding to a second transmission section transmitting light having second color, and a third pixel corresponding to a third transmission section transmitting light having third color, and the plurality of pixels of the second display panel include a fourth pixel (PIXb) and a fifth pixel (PIXa), the fourth pixel (PIXb) overlapping the first pixel while not overlapping the second pixel and the third pixel, the fifth pixel (PIXa) overlapping the second pixel and the third pixel while not overlapping the first pixel.

In the liquid crystal display device according to the first or fourth disclosure, the first transmission section may transmit green, yellow, or white light.

In the liquid crystal display device according to the fourth disclosure, the first display panel may further include a sixth pixel corresponding to a fourth transmission section transmitting light having fourth color, the first transmission section transmits white light, the fourth pixel (PIXb) over-laps the first pixel (W) while not overlapping the second pixel (R), the third pixel (G), and the sixth pixel (B), and the fifth pixel (PIXa) overlaps the second pixel (R), the third pixel (G), and the sixth pixel (B) while not overlapping the first pixel (W).

In the liquid crystal display device according to the fourth disclosure, the first display panel may further include a sixth pixel corresponding to a fourth transmission section transmitting light having fourth color, the first transmission section transmits green light, the fourth transmission section transmits white light, the fourth pixel (PIXb) may overlap the first pixel (G) and the sixth pixel (W) while not overlapping the second pixel (R) and the third pixel (B), and the fifth pixel (PIXa) may overlap the second pixel (R) and the third pixel (B) while not overlapping the first pixel (G) and the sixth pixel (W).

In the liquid crystal display device according to the first, second, third or fourth disclosure, the number of pixels per unit area in the second display panel may be smaller than the number of pixels per unit area in the first display panel.

BRIEF DESCRIPTION OF THE DRAWINGS

FIG. 12 is a plan view illustrating a schematic configuration of a second display panel according to the second exemplary embodiment;

FIG. 18 is a plan view illustrating a schematic configuration of a first display panel according to a third exemplary embodiment;

FIG. 19 is a plan view illustrating a schematic configuration of a second display panel according to the third exemplary embodiment;

FIG. 27 is a plan view illustrating a schematic configuration of a second display panel according to the fifth exemplary embodiment;

FIG. 29 is a plan view illustrating a schematic configuration of a first display panel according to a sixth exemplary embodiment;

FIG. 32 is a plan view illustrating a schematic configuration of a first display panel according to a seventh exemplary embodiment;

FIG. 33 is a plan view illustrating a schematic configuration of a second display panel according to the seventh exemplary embodiment;

DETAILED DESCRIPTION

Hereinafter, exemplary embodiments of the present disclosure will be described with reference to the drawings. A liquid crystal display device of each exemplary embodiment described below includes a plurality of display panels that display images, a plurality of driving circuits (a plurality of source drivers and a plurality of gate drivers) that drive the display panels, a plurality of timing controllers that control the driving circuits, an image processor that performs image processing on an input video signal input from an outside and outputs image data to each of the timing controllers, and a backlight that irradiates the plurality of display panels with light from a rear surface side. There is no limitation to the number of display panels, but it is only necessary to provide at least two display panels. When viewed from the observer side, the plurality of display panels are disposed while overlapping each other in a front-back direction. An image is displayed on each of the display panels. Liquid crystal display device LCD including two display panels will be described below by way of example.

Figure 1:
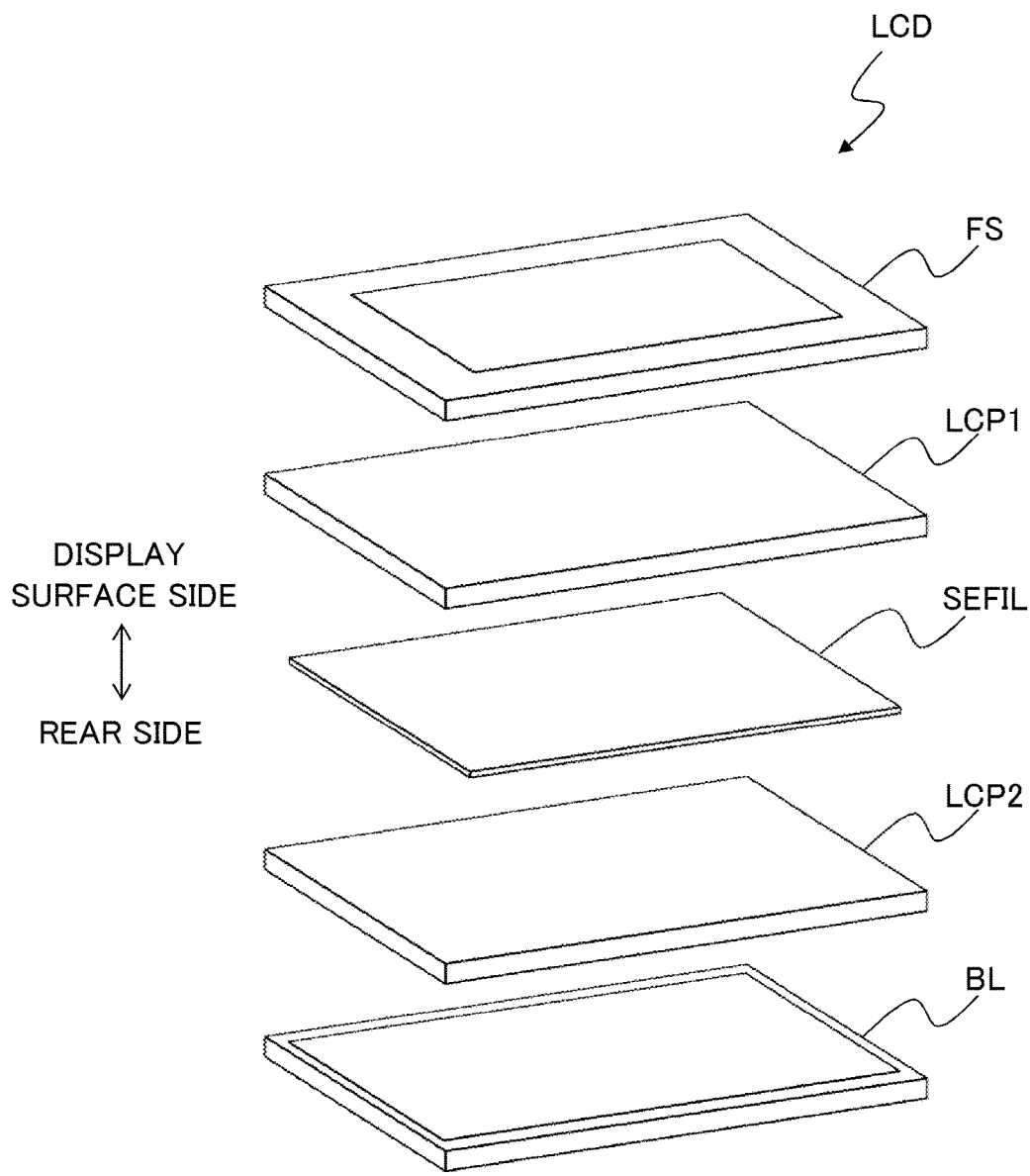
FIG. 1 is a perspective view illustrating a schematic configuration of a liquid crystal display device according to the present exemplary embodiment.

FIG. 1 is a perspective view illustrating a schematic configuration of liquid crystal display device LCD of the present exemplary embodiment. As illustrated in FIG. 1, liquid crystal display device LCD includes first display panel LCP1 which is disposed at a position (front side) closer to an observer, second display panel LCP2 which is disposed at a position (rear side) farther away from the observer than first display panel LCP1 is, adhesive layer SEFIL in which first display panel LCP1 and second display panel LCP2 adhere to each other, backlight BL disposed on the rear surface side of second display panel LCP2, and front chassis FS that covers first display panel LCP1 and second display panel LCP2 from the display surface side. Second display panel LCP2 may be disposed on the front side while first display panel LCP1 may be disposed on the rear side.

Figure 2:
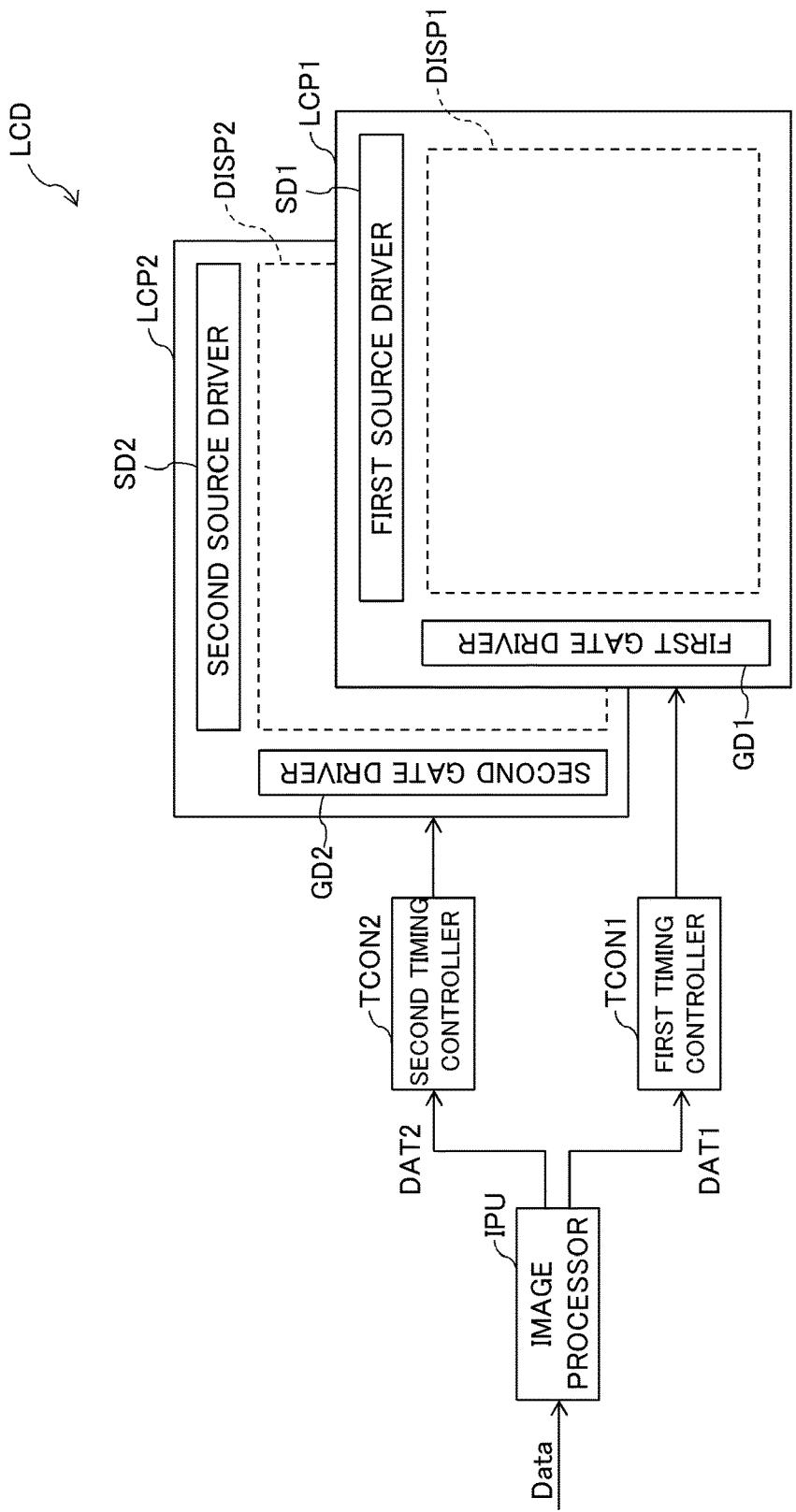
FIG. 2 is a view illustrating the schematic configuration of the liquid crystal display device according to the present exemplary embodiment.

FIG. 2 is a view illustrating the schematic configuration of liquid crystal display device LCD of the present exemplary embodiment. As illustrated in FIG. 2, first display panel LCP1 includes first source driver SD1 and first gate driver GD1, and second display panel LCP2 includes second source driver SD2 and second gate driver GD2. In addition, liquid crystal display device LCD includes first timing controller TCON1 that controls first source driver SD1 and first gate driver GD1, second timing controller TCON2 that controls second source driver SD2 and second gate driver GD2, and image processor IPU that outputs image data to first timing controller TCON1 and second timing controller TCON2. First display panel LCP1 displays a color image in first image display region DISP1 according to the input video signal, and second display panel LCP2 displays a black-and-white image in second image display region DISP2 according to the input video signal. Image processor IPU receives input video signal Data transmitted from an external system (not illustrated), performs known image processing on input video signal Data, outputs first image data DAT1 to first timing controller TCON1, and outputs second image data DAT2 to second timing controller TCON2. Image processor IPU also outputs a control signal (not illustrated in FIG. 2) such as a synchronizing signal to first timing controller TCON1 and second timing controller TCON2. First image data DAT1 is image data for displaying the color image, and second image data DAT2 is image data for displaying the black-and-white image.

First Exemplary Embodiment

Figure 3:
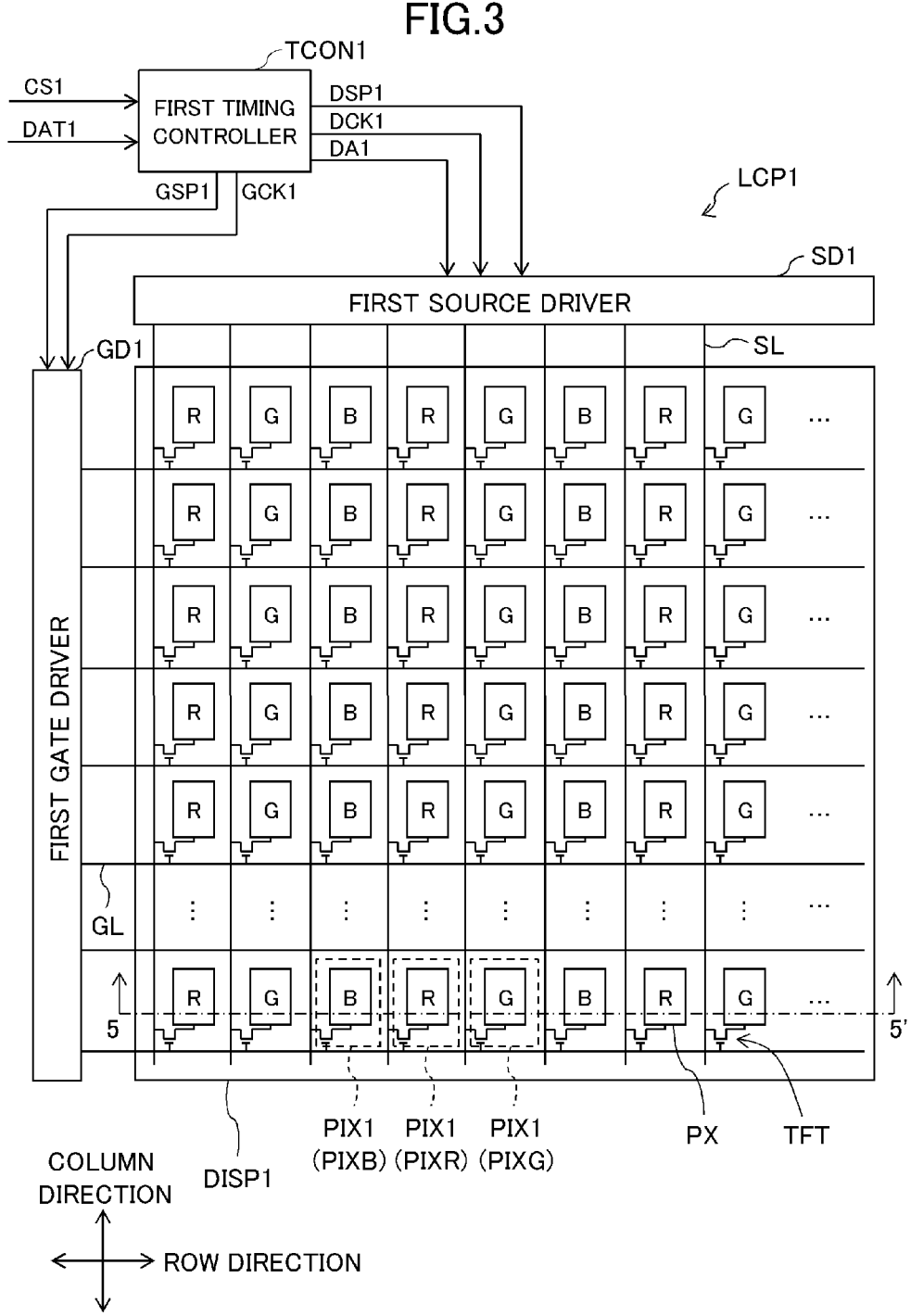
FIG. 3 is a plan view illustrating a schematic configuration of a first display panel according to a first exemplary embodiment.
Figure 4:
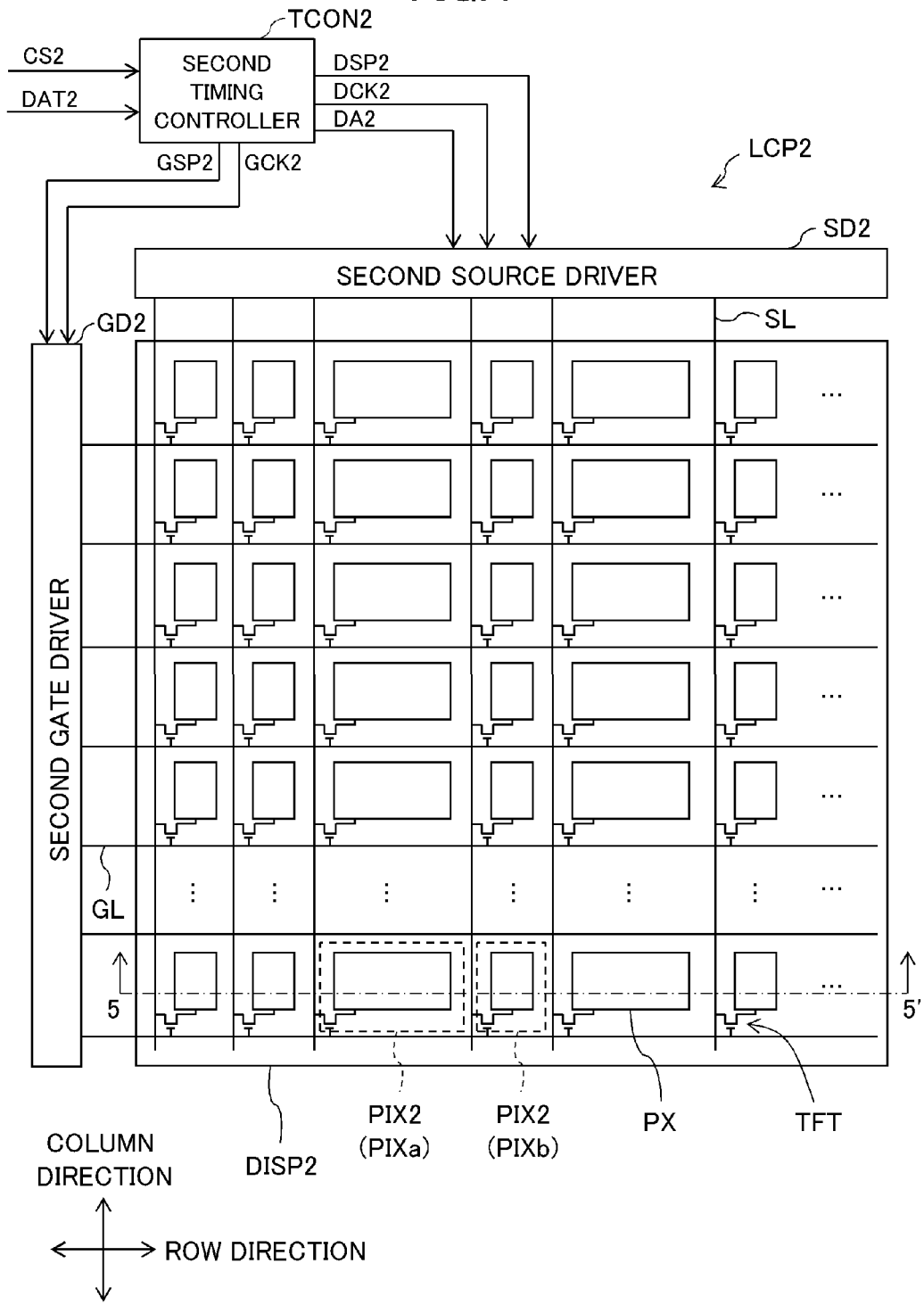
FIG. 4 is a plan view illustrating a schematic configuration of a second display panel according to the first exemplary embodiment.
Figure 5:
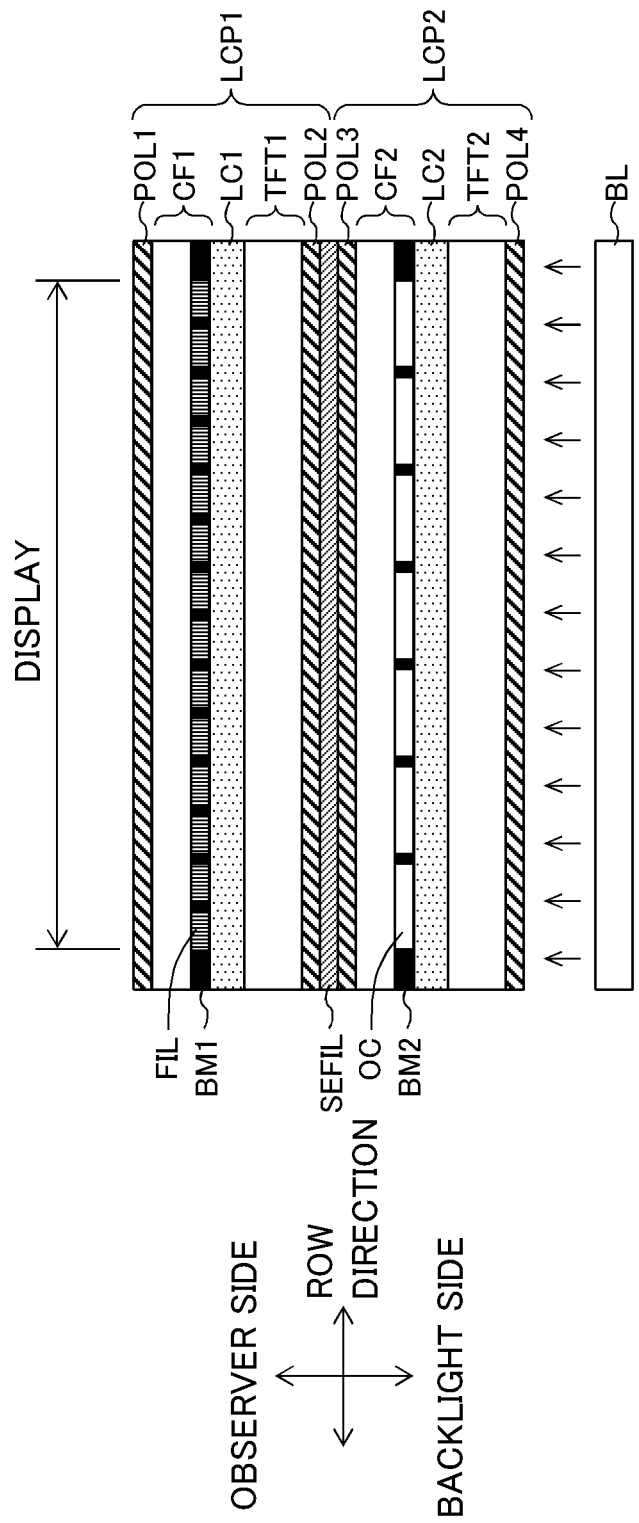
FIG. 5 is a sectional view taken along line 5-5' in FIGS. 3 and 4.

FIG. 3 is a plan view illustrating a schematic configuration of first display panel LCP1 according to a first exemplary embodiment, and FIG. 4 is a plan view illustrating a schematic configuration of second display panel LCP2 according to the first exemplary embodiment. FIG. 5 is a sectional view taken along line 5-5' in FIGS. 3 and 4.

The schematic configuration of first display panel LCP1 will be described with reference to FIGS. 3 and 5. As illustrated in FIG. 5, first display panel LCP1 includes thin film transistor substrate TFT1 disposed on the side of backlight BL, opposing substrate CF1 which is disposed on the observer side while being opposite to thin film transistor substrate TFT1, and liquid crystal layer LC1 disposed between thin film transistor substrate TFT1 and opposing substrate CF1. Polarizing plate POL2 is disposed on the side of backlight BL of first display panel LCP1, and polarizing plate POL1 is disposed on the observer side.

In thin film transistor substrate TFT1, as illustrated in FIG. 3, a plurality of source lines SL extending in a first direction (for example, a column direction), and a plurality of gate lines GL extending in a second direction (for example, a row direction) different from the first direction are formed, and thin film transistor TFT is formed close to an intersection between each of the plurality of source lines SL and each of the plurality of gate lines GL. In plan view of first display panel LCP1, a region surrounded by two source lines SL adjacent to each other and two gate lines GL adjacent to each other is defined as one pixel PIX1, and a plurality of pixels PIX1 are disposed in a matrix form (the row direction and the column direction). The plurality of source lines SL are disposed at equal intervals in the row direction, and the plurality of gate lines GL are disposed at equal intervals in the column direction. In thin film transistor substrate TFT1, pixel electrode PX is formed in each pixel PIX1, and one common electrode CT (see FIG. 8) common to the plurality of pixels PIX1 is formed. A source electrode constituting thin film transistor TFT is electrically connected to source line SL, drain electrode DD (see FIG. 7A) is electrically connected to pixel electrode PX through a contact hole, and a gate electrode is electrically connected to gate line GL.

As illustrated in FIG. 5, a plurality of color filter layers FIL (colored portions) are formed on opposing substrate CF1 according to each pixel PIX1. Each color filter layer FIL is surrounded by black matrix BM1 blocking light transmission. For example, each color filter layer FIL is formed into a rectangular shape. The plurality of color filter layers FIL include red color filter layers FILR (red portion) made of a red (R color) material to transmit red light, green color filter layers FILG (green portion) made of a green (G color) material to transmit green light, and blue color filter layers FILB (blue portion) made of a blue (B color) material to transmit blue light. Red color filter layers FILR, green color filter layers FILG, and blue color filter layers FILB are repeatedly arrayed in the row direction in this order, identical-color filter layers FIL are arrayed in the column direction, and black matrix BM is formed at a boundary between color filter layers FIL adjacent to each other in the row direction and the column direction. In accordance with color filter layers FIL, as illustrated in FIG. 3, the plurality of pixels PIX1 include red pixels PIXR corresponding to red color filter layers FILR, green pixels PIXG corresponding to green color filter layers FILG, and blue pixels PIXB corresponding to blue color filter layers FILB. In first display panel LCP1, red pixels PIXR, green pixels PIXG, and blue pixels PIXB are repeatedly arrayed in the row direction in this order, and pixels PIX1 having the identical color are arrayed in the column direction.

First timing controller TCON1 has a known configuration. For example, based on first image data DAT1 and first control signal CS1 (such as a clock signal, a vertical synchronizing signal, and a horizontal synchronizing signal), which are output from image processor IPU, first timing controller TCON1 generates various timing signals (data start pulse DSP1, data clock DCK1, gate start pulse GSP1, and gate clock GCK1) to control first image data DA1 and drive of first source driver SD1 and first gate driver GD1 (see FIG. 3). First timing controller TCON1 outputs first image data DA1, data start pulse DSP1, and data clock DCK1 to first source driver SD1, and outputs gate start pulse GSP1 and gate clock GCK1 to first gate driver GD1.

First source driver SD1 outputs a data signal (data voltage) corresponding to first image data DA1 to source line SL based on data start pulse DSP1 and data clock DCK1. First gate driver GD1 outputs a gate signal (gate voltage) to gate lines GL based on gate start pulse GSP1 and gate clock GCK1.

First source driver SD1 supplies the data voltage to source line SL, and first gate driver GD1 supplies the gate voltage to gate line GL. Common voltage Vcom is supplied from a common driver (not illustrated) to common electrode CT. When the gate voltage (gate-on voltage) is supplied to gate line GL, thin film transistor TFT connected to gate line GL is turned on, and the data voltage is supplied to pixel electrode PX through source line SL connected to thin film transistor TFT. An electric field is generated by a difference between the data voltage supplied to pixel electrode PX and common voltage Vcom supplied to common electrode CT. The liquid crystal is driven by the electric field, and transmittance of the light emitted from backlight BL is controlled, thereby displaying an image. In first display panel LCP1, a color image is displayed by the supply of a desired data voltage to source line SL connected to pixel electrode PX of each of red pixel PIXR, green pixel PIXG, and blue pixel PIXB.

The schematic configuration of second display panel LCP2 will be described with reference to FIGS. 4 and 5. As illustrated in FIG. 5, second display panel LCP2 includes thin film transistor substrate TFT2 disposed on the side of backlight BL, opposing substrate CF2, which is disposed on the observer side while being opposite to thin film transistor substrate TFT2, and liquid crystal layer LC2 disposed between thin film transistor substrate TFT2 and opposing substrate CF2. Polarizing plate POL4 is disposed on the side of backlight BL of second display panel LCP2, and polarizing plate POL3 is disposed on the observer side of second display panel LCP2. Adhesive layer SEFIL is disposed between polarizing plate POL2 of first display panel LCP1 and polarizing plate POL3 of second display panel LCP2.

In thin film transistor substrate TFT2, as illustrated in FIG. 4, a plurality of source lines SL extending in the column direction, and a plurality of gate lines GL extending in the row direction are formed, and thin film transistor TFT is formed close to the intersection between each of the plurality of source lines SL and each of the plurality of gate lines GL. In plan view of second display panel LCP2, a region surrounded by two source lines SL adjacent to each other and two gate lines GL adjacent to each other is defined as one pixel PIX2, and a plurality of pixels PIX2 are disposed in a matrix form (the row direction and the column direction). The plurality of gate lines GL are disposed at equal intervals in the column direction. In thin film transistor substrate TFT2, pixel electrode PX is formed in each pixel PIX2, and one common electrode CT (see FIG. 8) common to the plurality of pixels PIX2 is formed. A source electrode constituting thin film transistor TFT is electrically connected to source line SL, drain electrode DD (see FIG. 7B) is electrically connected to pixel electrode PX through a contact hole, and a gate electrode is electrically connected to gate line GL.

As illustrated in FIG. 5, in opposing substrate CF2, black matrix BM2 is formed at a position corresponding to a boundary of each pixel PIX2. The color filter layer (colored portion) is not formed in a region surrounded by black matrix BM2. For example, overcoat film OC is formed in the region.

Second timing controller TCON2 has a known configuration. For example, based on second image data DAT2 and second control signal CS2 (such as a clock signal, a vertical synchronizing signal, and a horizontal synchronizing signal), which are output from image processor IPU, second timing controller TCON2 generates various timing signals (data start pulse DSP2, data clock DCK2, gate start pulse GSP2, and gate clock GCK2) to control second image data DA2 and drive of second source driver SD2 and second gate driver GD2 (see FIG. 4). Second timing controller TCON2 outputs second image data DA2, data start pulse DSP2, and data clock DCK2 to second source driver SD2, and outputs gate start pulse GSP2 and gate clock GCK2 to second gate driver GD2.

Second source driver SD2 outputs the data voltage corresponding to second image data DA2 to source line SL based on data start pulse DSP2 and data clock DCK2. Second gate driver GD2 outputs the gate voltage to gate lines GL based on gate start pulse GSP2 and gate clock GCK2.

Second source driver SD2 supplies the data voltage to each source line SL, and second gate driver GD2 supplies the gate voltage to each gate line GL. The common driver supplies common voltage Vcom to common electrode CT. When the gate voltage (gate-on voltage) is supplied to gate line GL, thin film transistor TFT connected to gate line GL is turned on, and the data voltage is supplied to pixel electrode PX through source line SL connected to thin film transistor TFT. An electric field is generated by a difference between the data voltage supplied to pixel electrode PX and common voltage Vcom supplied to common electrode CT. The liquid crystal is driven by the electric field, and transmittance of the light emitted from backlight BL is controlled, thereby displaying an image. A black-and-white image is displayed on second display panel LCP2.

Liquid crystal display device LCD is configured such that the number of pixels PIX2 per area of second display panel LCP2 is smaller than the number of pixels PIX1 per area of first display panel LCP1. For example, liquid crystal display device LCD includes a region where two pixels PIX1 of first display panel LCP1 and one pixel PIX2 (PIXa) of second display panel LCP2 correspond to each other (overlap each other in plan view), and a region where one pixel PIX1 of first display panel LCP1 and one pixel PIX2 (PIXb) of second display panel LCP2 correspond to each other (overlap each other in plan view).

Figure 6A:
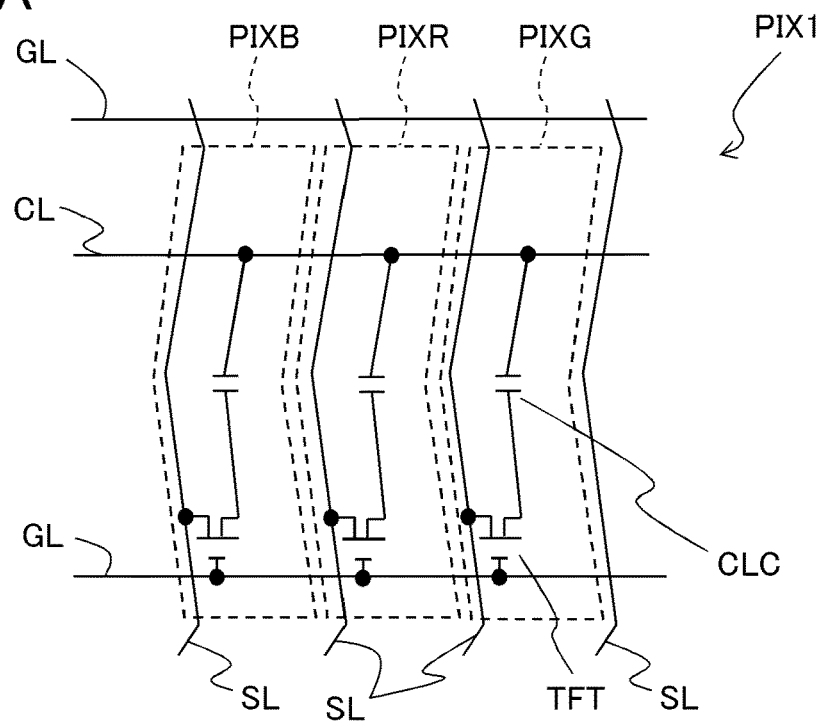
FIGS. 6A and 6B are plan views illustrating a relationship between pixels of the first display panel and pixels of the second display panel.
Figure 6B:
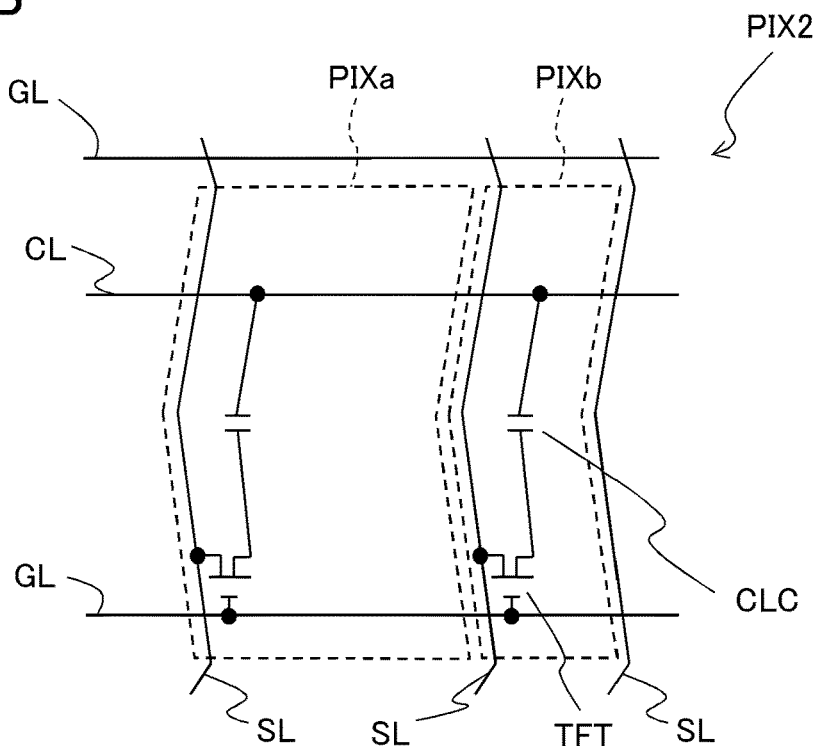
Figure 7A:
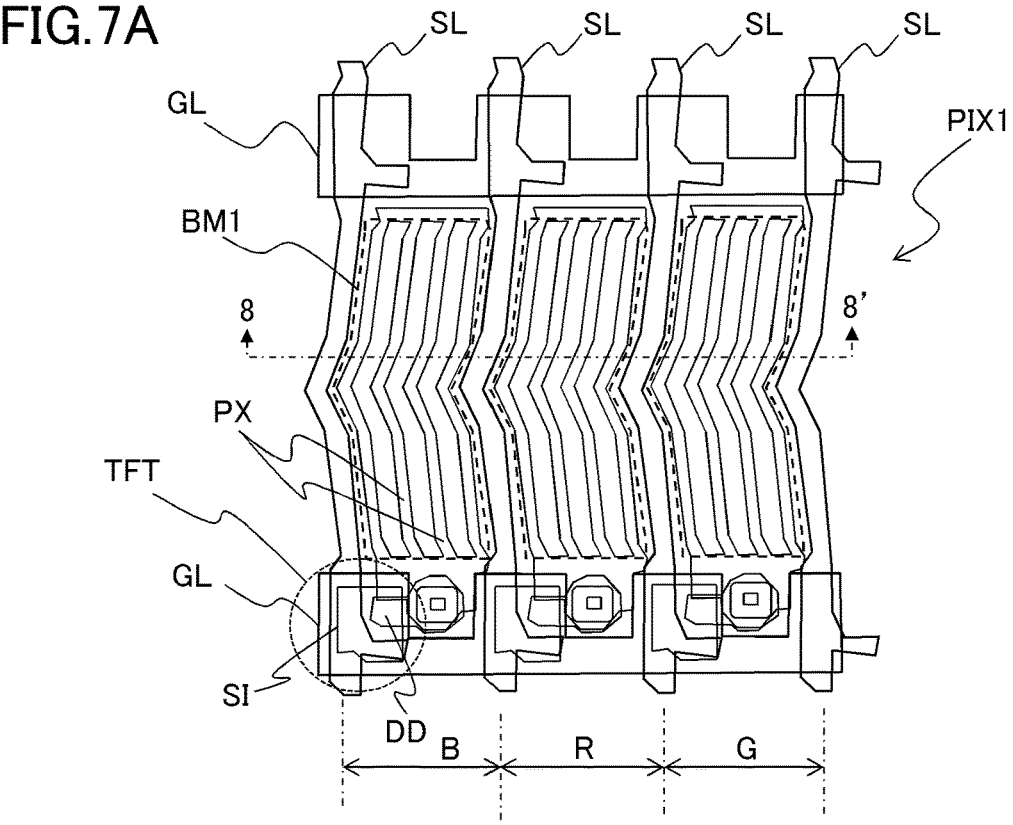
FIG. 7A is a plan view illustrating specific configurations of pixels corresponding to FIG. 6A.
Figure 7B:
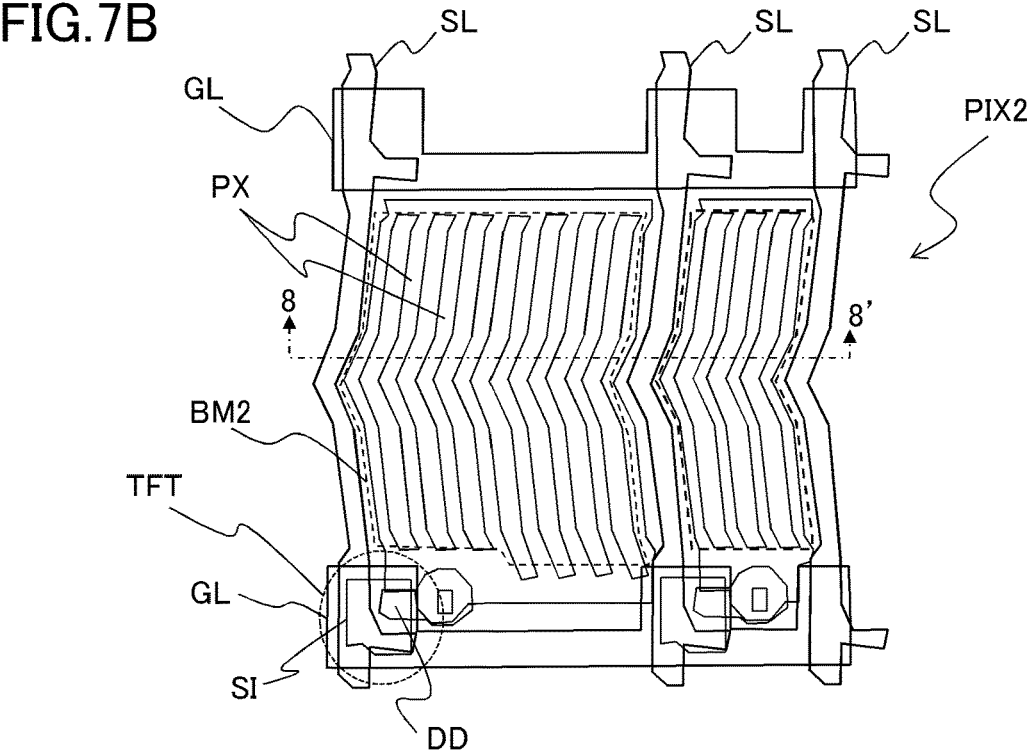
FIG. 7B is a plan view illustrating specific configurations of pixels corresponding to FIG. 6B.

FIGS. 6A and 6B are plan views illustrating a relationship between pixel PIX1 of first display panel LCP1 and pixel PIX2 of second display panel LCP2, which overlap each other. FIGS. 7A and 7B are plan views illustrating specific configurations of pixels PIX1 and PIX2 corresponding to FIGS. 6A and 6B. In an example of FIGS. 6A and 6B, one blue pixel PIXB and one red pixel PIXR of first display panel LCP1 and one pixel PIXa of second display panel LCP2 are overlapping each other in plan view, and one green pixel PIXG of first display panel LCP1 and one pixel PIXb of second display panel LCP2 are overlapping each other in plan view. In the case that pixels PIX1 of first display panel LCP1 are equal to each other in an area (size), the area of one pixel PIXb of second display panel LCP2 is equal to the area of one pixel PIX1 of first display panel LCP1, and the area of one pixel PIXa of second display panel LCP2 is double the area of one pixel PIX1 of first display panel LCP1 (or one pixel PIXb of second display panel LCP2). The area of one pixel PIXa is equal to a total area of one blue pixel PIXB and one red pixel PIXR, and the area of one pixel PIXb is equal to the area of one green pixel PIXG. FIGS. 6A and 6B illustrate common wiring CL connected to common electrode CT and liquid crystal capacitance CLC. FIGS. 7A and 7B illustrate semiconductor layer SI and drain electrode DD, which constitute thin film transistor TFT. As illustrated in FIGS. 7A and 7B, a slit may be formed in pixel electrode PX.

Figure 8:
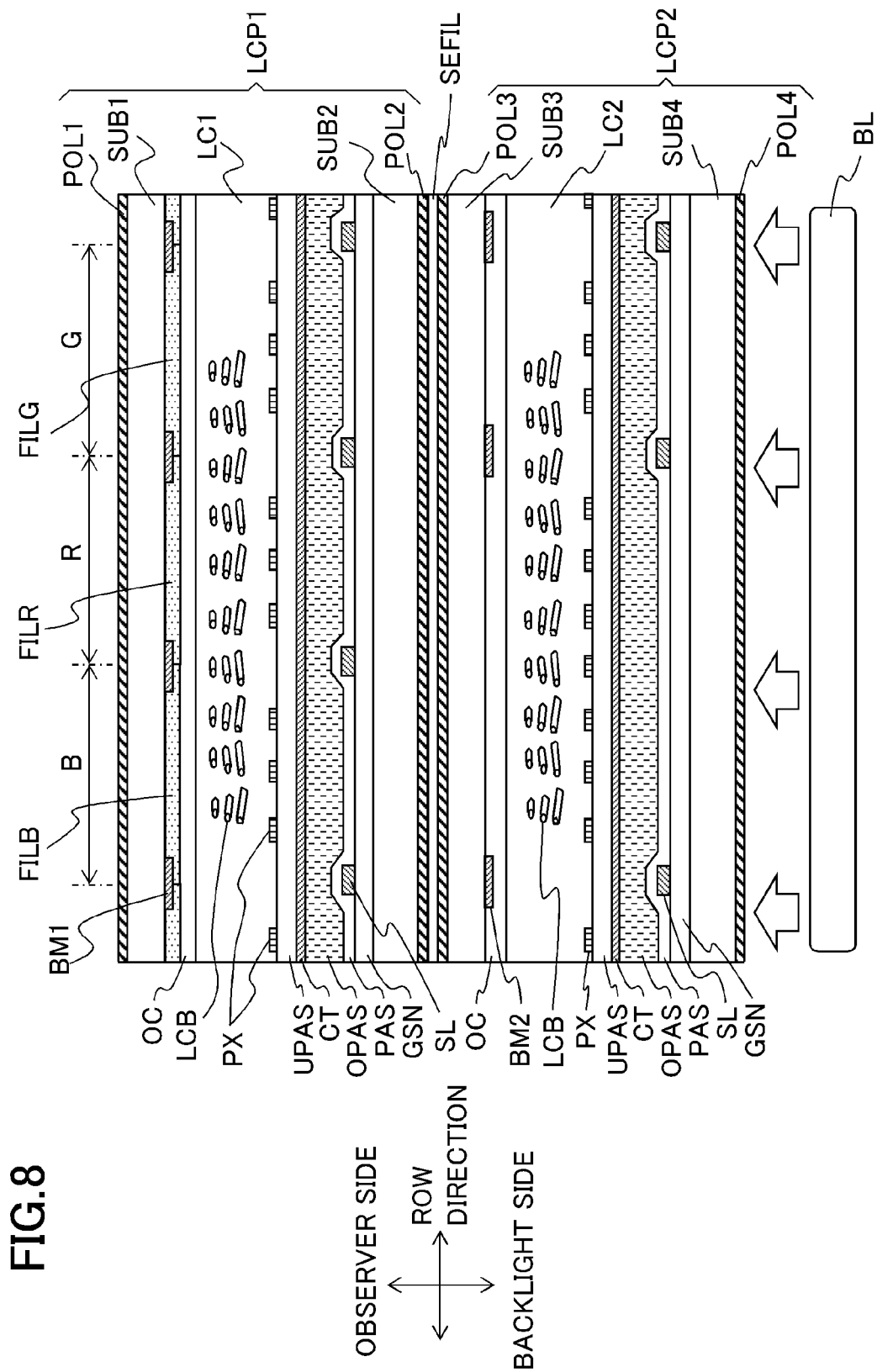
FIG. 8 is a sectional view taken along line 8-8' in FIGS. 7A and 7B.

FIG. 8 is a sectional view taken along line 8-8' in FIGS. 7A and 7B. Sectional structures of pixels PIX1 and PIX2 will be described below with reference to FIG. 8.

In thin film transistor substrate TFT1 constituting pixel PIX1 of first display panel LCP1, gate line GL (see FIG. 7A) is formed on transparent substrate SUB2 (glass substrate), and gate insulating film GSN is formed so as to cover gate line GL. Source lines SL are formed on gate insulating film GSN, and protective film PAS and organic film OPAS are formed so as to cover source lines SL. Common electrode CT is formed on organic film OPAS, and protective film UPAS is formed so as to cover common electrode CT. Pixel electrodes PX are formed on protective film UPAS, and an alignment film (not illustrated) is formed so as to cover pixel electrodes PX. Source lines SL are disposed at equal intervals in the row direction. In opposing substrate CF1, black matrix BM and color filter layer FIL (red color filter layer FILR, green color filter layer FILG, and blue color filter layer FILB) are formed on transparent substrate SUB1 (glass substrate). Overcoat film OC covers a surface of color filter layer FIL, and an alignment film (not illustrated) is formed on overcoat film OC.

In pixel PIX2 of second display panel LCP2, in plan view, source line SL and black matrix BM are formed in a portion overlapping a boundary between green pixel PIXG and blue pixel PIXB of first display panel LCP1 and a portion overlapping a boundary between green pixel PIXG and red pixel PIXR of first display panel LCP1, but source line SL and black matrix BM are not formed in a portion overlapping a boundary between blue pixel PIXB and red pixel PIXR of first display panel LCP1. That is, in plan view, source line SL of second display panel LCP2 is disposed at a boundary of green pixel PIXG such that green pixel PIXG is sandwiched between source lines SL of second display panel LCP2. In pixel PIX2 of second display panel LCP2, color filter layer FIL is not formed on opposing substrate CF2. Another pixel structure of pixel PIX2 of second display panel LCP2 is identical to the pixel structure of pixel PIX1 of first display panel LCP1.

Figure 9A:
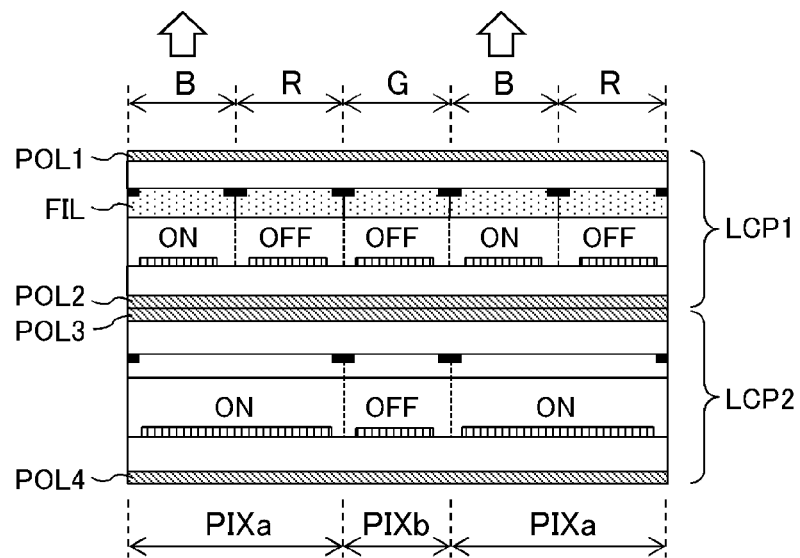
FIG. 9A is a schematic view illustrating an example of a displayed image of the liquid crystal display device according to the first exemplary embodiment.
Figure 9B:
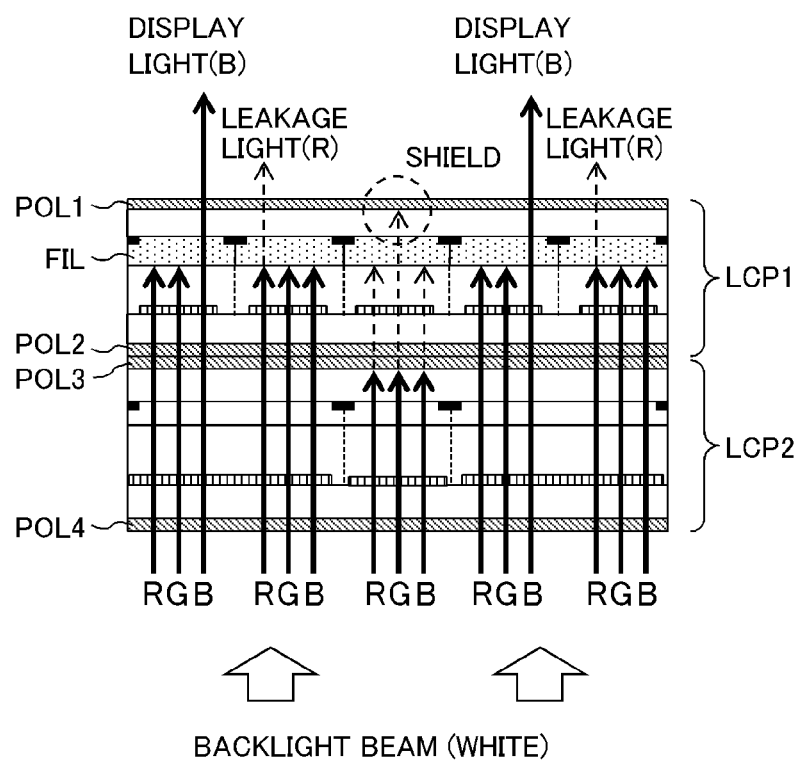
FIG. 9B is a schematic view illustrating an example of a displayed image of the liquid crystal display device according to the first exemplary embodiment.

As described above, one pixel PIX1 (first-color pixel) of first display panel LCP1 and one pixel PIX2 of second display panel LCP2 are overlapping each other, and two pixels PIX1 (a second-color pixel and a third-color pixel) of first display panel LCP1 and one pixel PIX2 of second display panel LCP2 are overlapping each other. For example, one green pixel PIXG of first display panel LCP1 and one pixel PIX2 (pixel PIXb) of second display panel LCP2 are overlapping each other, and one blue pixel PIXB and one red pixel PIXR of first display panel LCP1 and one pixel PIX2 (pixel PIXa) of second display panel LCP2 are overlapping each other. In the case that a blue monochrome image is displayed as illustrated in FIG. 9A in the above configuration, in first display panel LCP1, blue pixel PIXB is put into an on state, and red pixel PIXR and green pixel PIXG are put into an off state. In second display panel LCP2, pixel PIXa overlapping blue pixel PIXB and red pixel PIXR is put into the on state, and pixel PIXb overlapping green pixel PIXG is put into the off state. At this point, when liquid crystal display device LCD is irradiated with the backlight beam (white) including RGB components, the true display light (blue) is output from blue pixel PIXB as illustrated in FIG. 9B. In green pixel PIXG, the leakage light (white) of second display panel LCP2 is incident on first display panel LCP1, green color filter layer FILG shields red and blue components of the leakage light, and polarizing plate POL1 shields a green component. Thus, the on and off states of green pixel PIXG and pixel PIXb, which are disposed in a one-to-one relationship, can be controlled independently of other pixels. Accordingly, even if the light leakage occurs in second display panel LCP2, color filter layer FIL and polarizing plate POL1 of first display panel LCP1 can shield each color component of the leakage light. Therefore, the light leakage is reduced compared with the conventional configuration, so that the color reproducibility can be improved. In the first exemplary embodiment, the light leakage of the green component having visual sensitivity higher than that of other colors can be prevented because green pixel PIXG of first display panel LCP1 and pixel PIXb of second display panel LCP2 are disposed in the one-to-one relationship. Therefore, the color reproducibility can further be enhanced.

Figure 10:
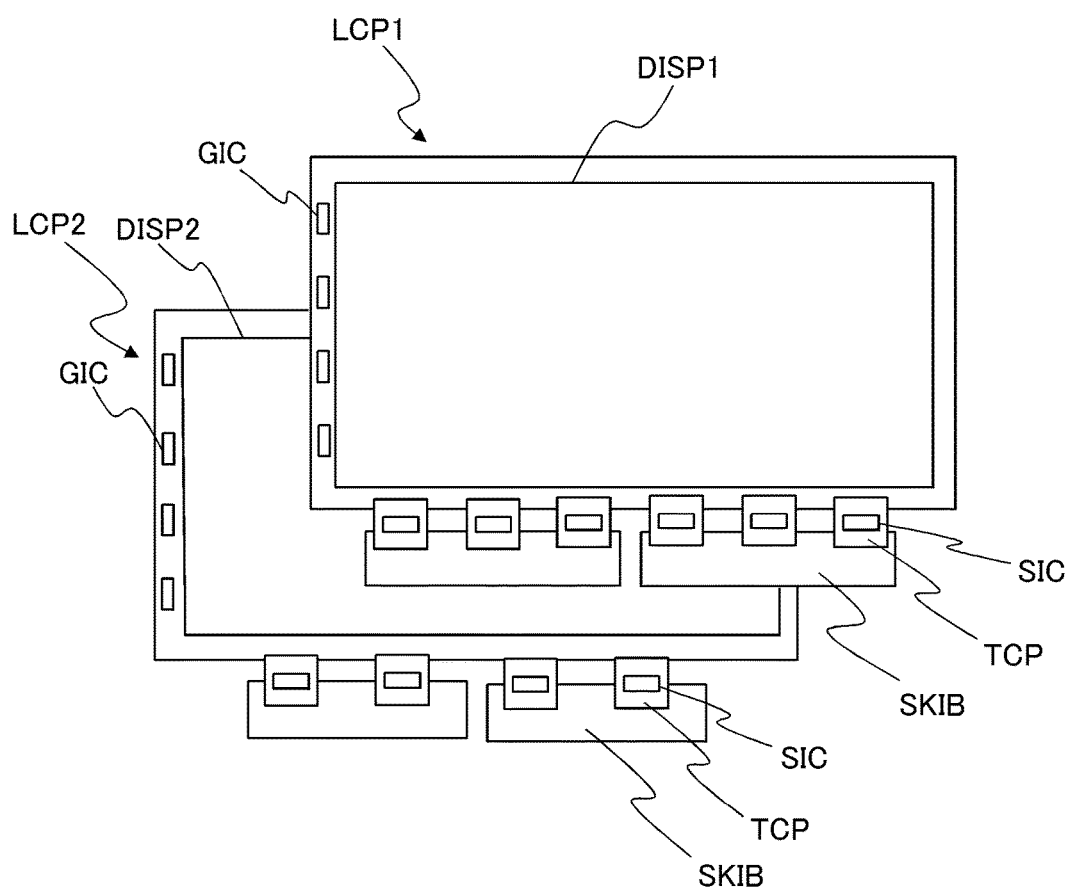
FIG. 10 is a view illustrating configurations of drivers of the first display panel and the second display panel.

In the above configuration, a scale of second source driver SD2 of second display panel LCP2 can be reduced. FIG. 10 is a view illustrating configurations of drivers of first display panel LCP1 and second display panel LCP2. Six tape carrier packages (TCPs) in each of which the source driver IC (SIC) is mounted are connected to first display panel LCP1, and each TCP is connected to source printed board SKIB. On the other hand, four TCPs in each of which the source driver IC (SIC) is mounted are connected to second display panel LCP2, and each TCP is connected to source printed board SKIB. Thus, the cost of liquid crystal display device LCD can be reduced because the number of source driver ICs of second display panel LCP2 can be decreased compared with first display panel LCP1.

Second Exemplary Embodiment

A second exemplary embodiment of the present disclosure will be described below with reference to the drawings. For convenience, the same component as that of the first exemplary embodiment is designated by the same numeral, and the description will be omitted. In the second exemplary embodiment, the term defined in the first exemplary embodiment is used according to the definition of the first exemplary embodiment unless otherwise noted. The same holds true for the following exemplary embodiments.

Figure 11:
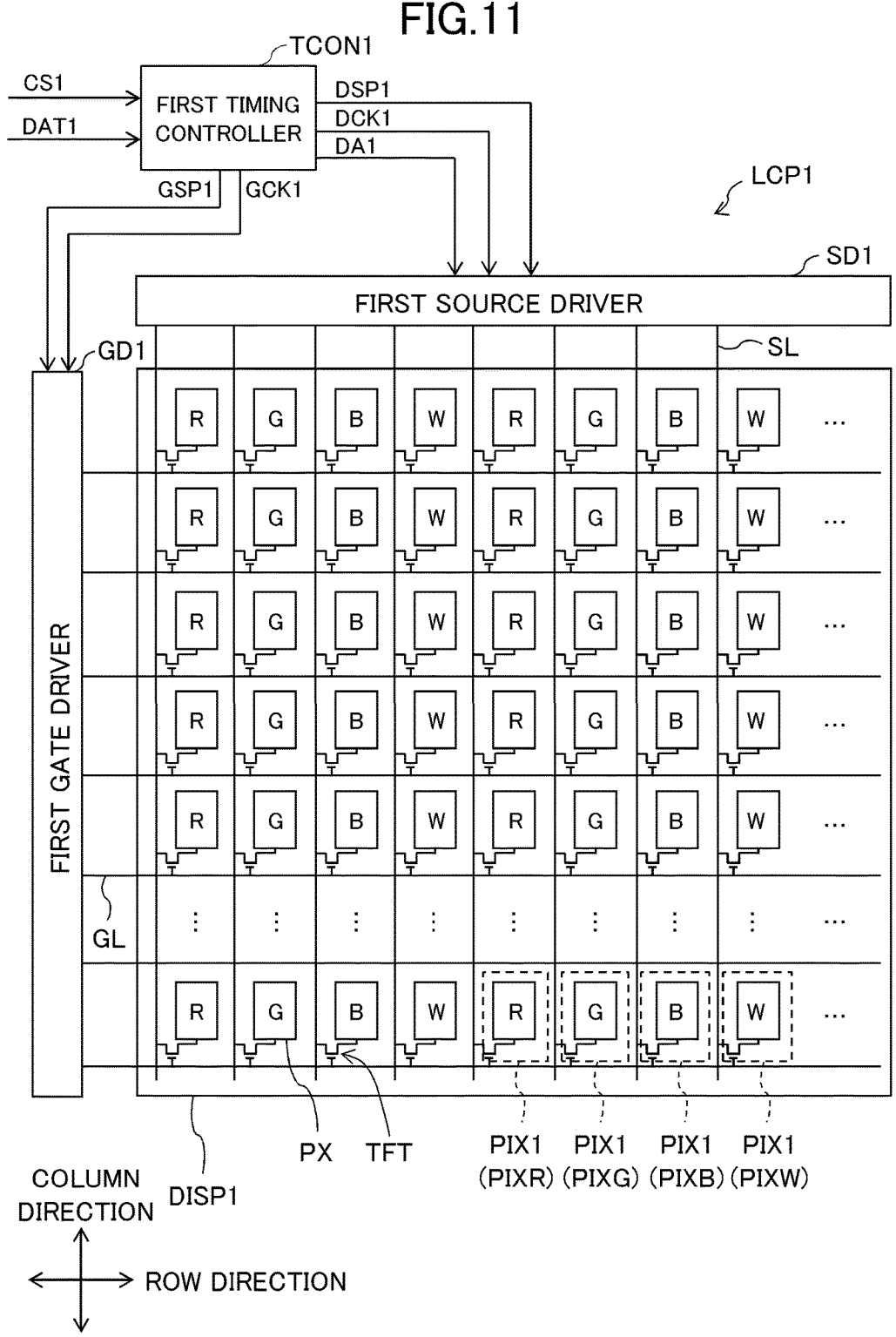
FIG. 11 is a plan view illustrating a schematic configuration of a first display panel according to a second exemplary embodiment.

FIG. 11 is a plan view illustrating a schematic configuration of first display panel LCP1 according to the second exemplary embodiment, and FIG. 12 is a plan view illustrating a schematic configuration of second display panel LCP2 according to the second exemplary embodiment.

As illustrated in FIG. 11, in first display panel LCP1, a plurality of pixels PIX1 include red pixels PIXR, green pixels PIXG, blue pixels PIXB, and white pixels PIXW. Red pixel PIXR, green pixel PIXG, blue pixel PIXB, and white pixel PIXW are repeatedly arrayed in the row direction in this order, and pixels PIX1 having the identical color are arrayed in the column direction.

Similarly to the first exemplary embodiment, liquid crystal display device LCD of the second exemplary embodiment is configured such that the number of pixels PIX2 per area of second display panel LCP2 is smaller than the number of pixels PIX1 per area of first display panel LCP1. Specifically, liquid crystal display device LCD includes a region where three pixels PIX1 of first display panel LCP1 and one pixel PIX2 (PIXa) of second display panel LCP2 correspond to each other (overlap each other in plan view) and a region where one pixel PIX1 of first display panel LCP1 and one pixel PIX2 (PIXb) of second display panel LCP2 correspond to each other (overlap each other in plan view).

Figure 13A:
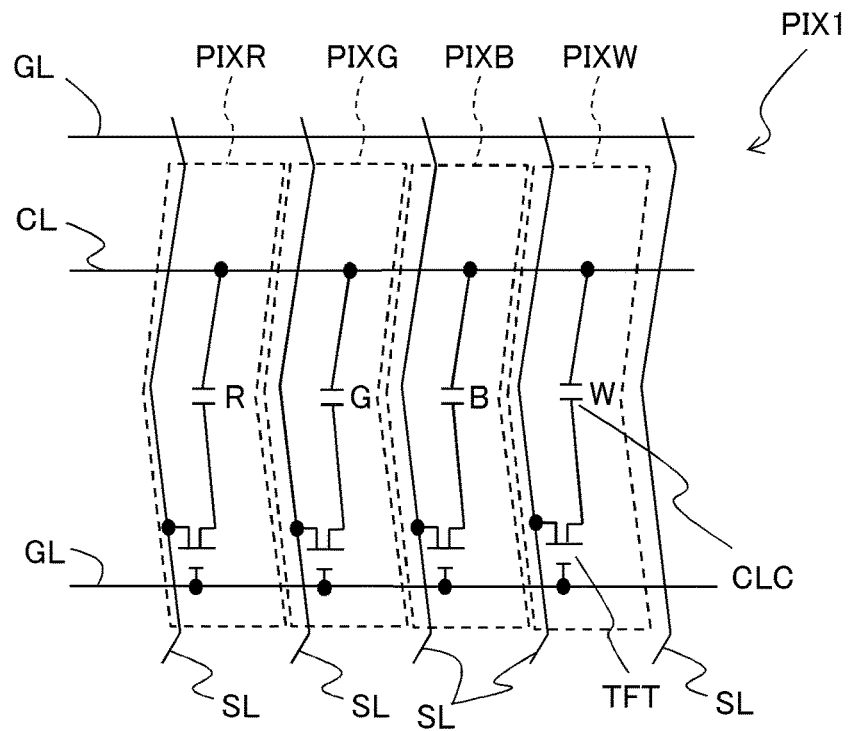
FIGS. 13A and 13B are plan views illustrating a relationship between pixels of the first display panel and pixels of the second display panel.
Figure 13B:
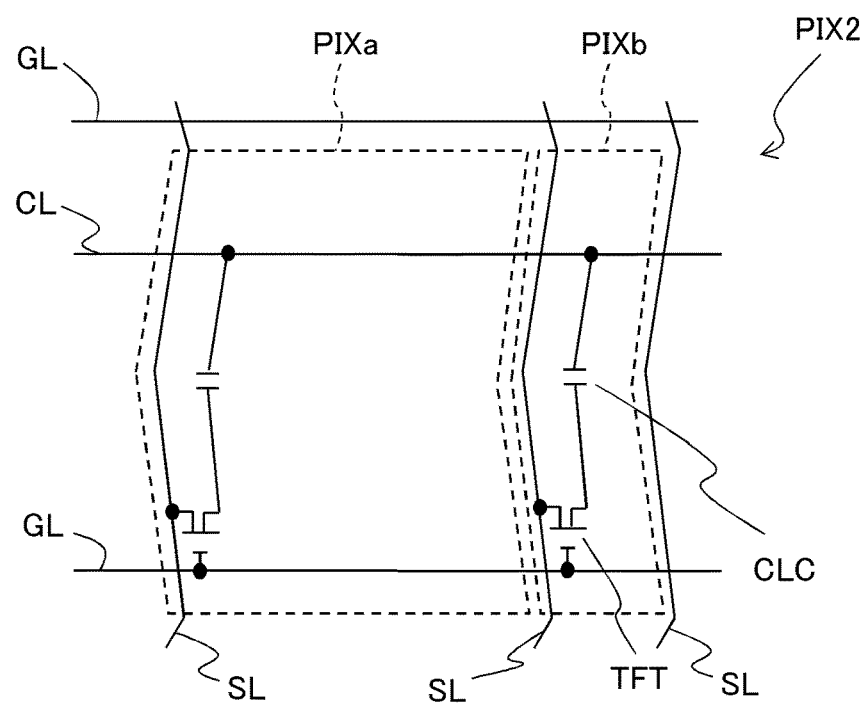
Figure 14A:
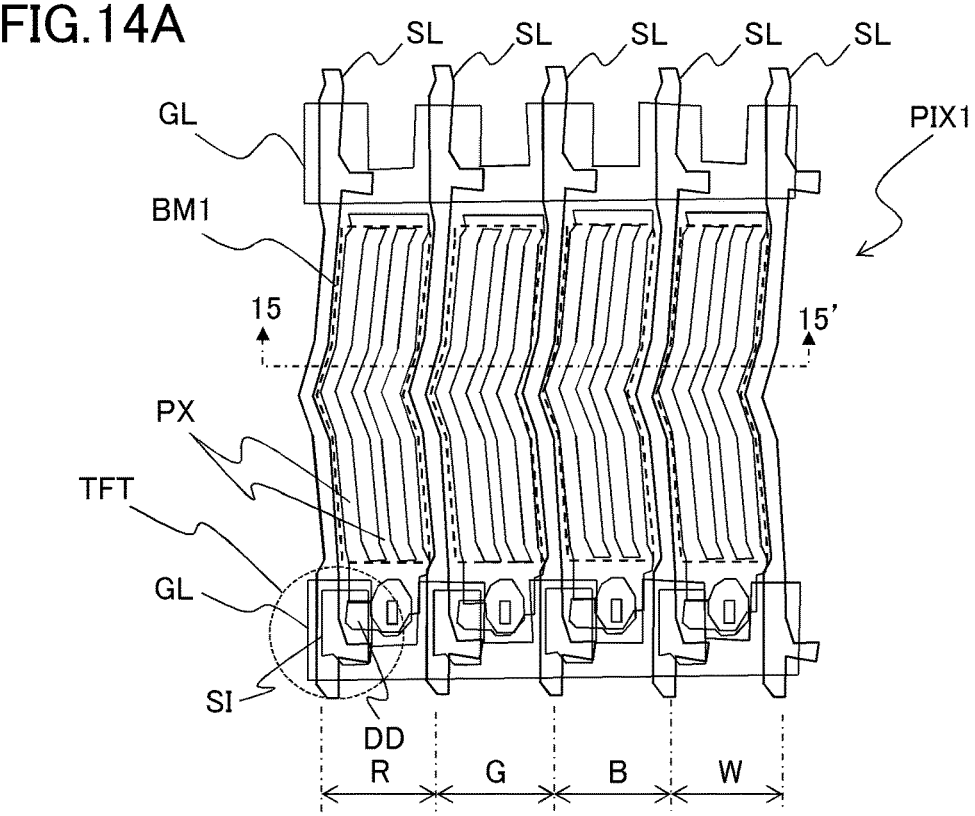
FIG. 14A is a plan view illustrating specific configurations of pixels and corresponding to FIG. 13A.
Figure 14B:
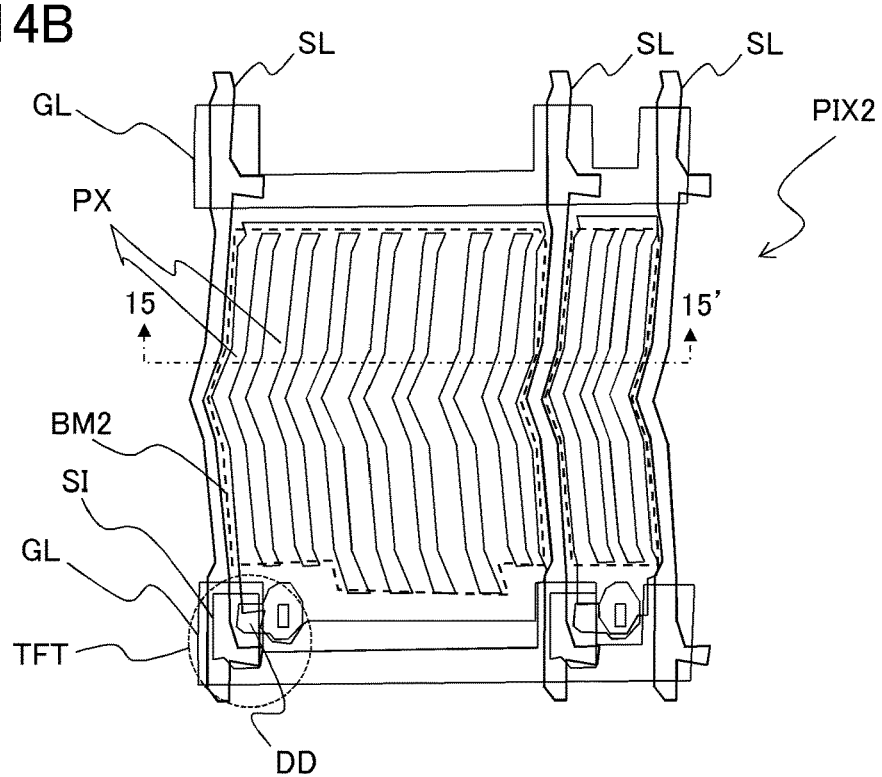
FIG. 14B is a plan view illustrating specific configurations of pixels and corresponding to FIG. 13B.

FIGS. 13A and 13B are plan views illustrating a relationship between pixel PIX1 of first display panel LCP1 and pixel PIX2 of second display panel LCP2, which overlap each other. FIGS. 14A and 14B are plan views illustrating specific configurations of pixels PIX1 and PIX2 corresponding to FIGS. 13A and 13B. In an example of FIGS. 13A and 13B, one red pixel PIXR, one green pixel PIXG, and one blue pixel PIXB of first display panel LCP1 and one pixel PIXa of second display panel LCP2 are disposed while overlapping each other in plan view, and one white pixel PIXW of first display panel LCP1 and one pixel PIXb of second display panel LCP2 are disposed while overlapping each other in plan view. In the case that pixels PIX1 of first display panel LCP1 are equal to each other in an area (size), the area of one pixel PIXb of second display panel LCP2 is equal to the area of one pixel PIX1 of first display panel LCP1, and the area of one pixel PIXa of second display panel LCP2 is triple the area of one pixel PIX1 of first display panel LCP1 (or one pixel PIXb of second display panel LCP2). The area of one pixel PIXa is equal to a total area of one red pixel PIXR, one green pixel PIXG, and one blue pixel PIXB, and the area of one pixel PIXb is equal to the area of white pixel PIXW.

Figure 15:
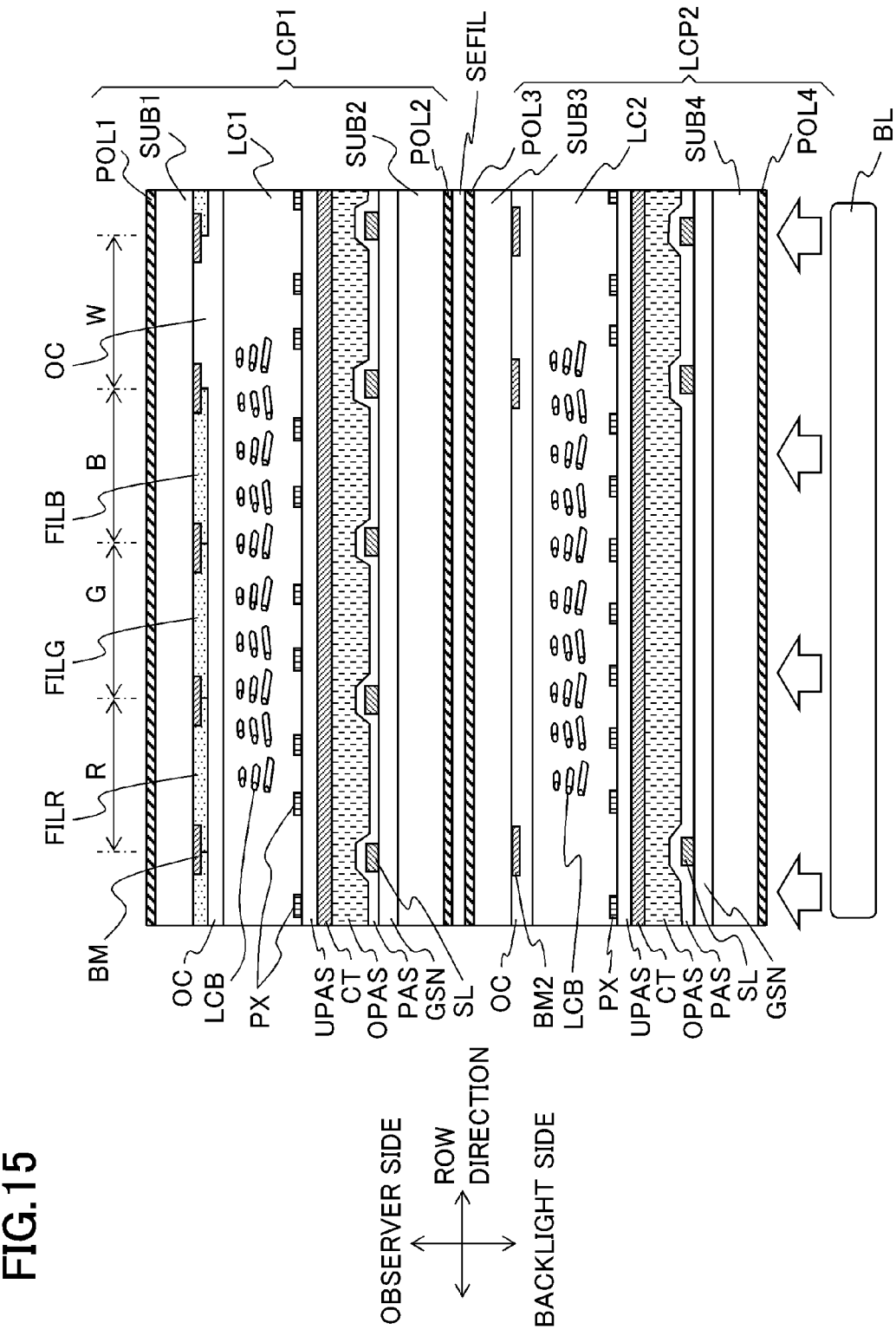
FIG. 15 is a sectional view taken along line 15-15' in FIGS. 14A and 14B.

FIG. 15 is a sectional view taken along line 15-15' in FIGS. 14A and 14B. The sectional structures of pixels PIX1 and PIX2 will be described below with reference to FIG. 15.

In opposing substrate CF1 of first display panel LCP1, red color filter layer FILR corresponding to red pixel PIXR, green color filter layer FILG corresponding to green pixel PIXG, and blue color filter layer FILB corresponding to blue pixel PIXB are formed, and not color filter layer FIL but overcoat film OC is formed in a portion (white portion) corresponding to white pixel PIXW.

In pixel PIX2 of second display panel LCP2, in plan view, source line SL and black matrix BM are formed in a portion overlapping a boundary between white pixel PIXW and blue pixel PIXB of first display panel LCP1 and a portion overlapping a boundary between white pixel PIXW and red pixel PIXR of first display panel LCP1, but source line SL and black matrix BM are formed in neither a portion overlapping a boundary between red pixel PIXR and green pixel PIXG of first display panel LCP1 nor a portion overlapping a boundary between green pixel PIXG and blue pixel PIXB of first display panel LCP1. That is, in second display panel LCP2, in plan view, source line SL is disposed at a boundary of white pixel PIXW such that white pixel PIXW is sandwiched between source lines SL.

Figure 16A:
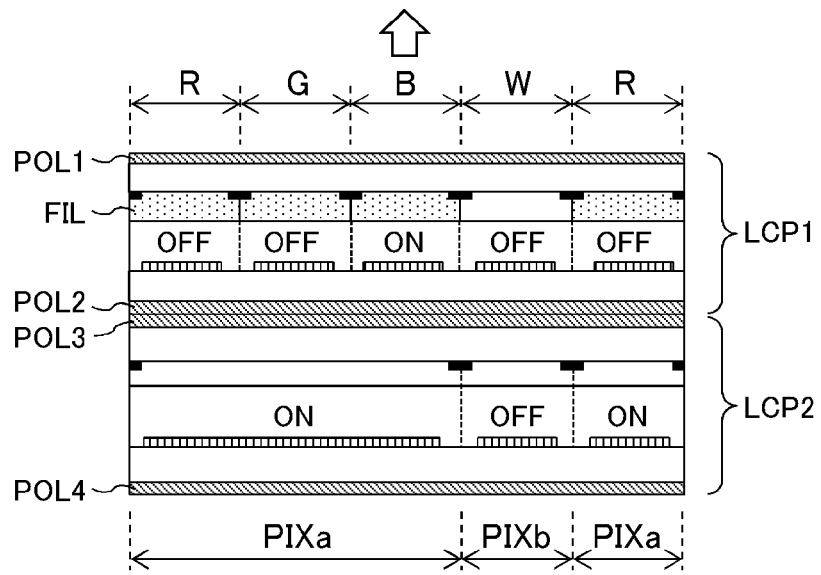
FIG. 16A is a schematic view illustrating an example of a displayed image of the liquid crystal display device according to the second exemplary embodiment.
Figure 16B:
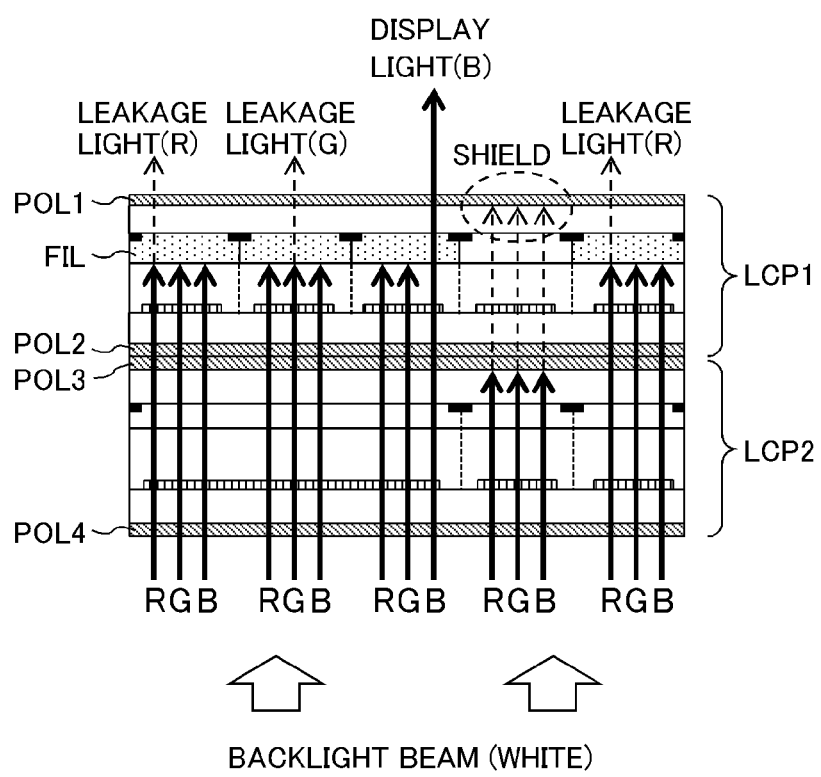
FIG. 16B is a schematic view illustrating an example of a displayed image of the liquid crystal display device according to the second exemplary embodiment.

In the second exemplary embodiment, one white pixel PIXW of first display panel LCP1 and one pixel PIX2 (pixel PIXb) of second display panel LCP2 are overlapping each other, and one red pixel PIXR, one green pixel PIXG and one blue pixel PIXB of first display panel LCP1 and one pixel PIX2 (pixel PIXa) of second display panel LCP2 are overlapping each other. In the case that the blue monochrome image is displayed as illustrated in FIG. 16A in the above configuration, in first display panel LCP1, blue pixel PIXB is put into the on state, and red pixel PIXR, green pixel PIXG, and white pixel PIXW are put into the off state. In second display panel LCP2, pixel PIXa overlapping red pixel PIXR, green pixel PIXG, and blue pixel PIXB is put into the on state, and pixel PIXb overlapping white pixel PIXW is put into the off state. At this point, when liquid crystal display device LCD is irradiated with the backlight beam (white) including RGB components, the display light (blue) is output from blue pixel PIXB as illustrated in FIG. 16B. In white pixel PIXW, the leakage light (white) of second display panel LCP2 is incident on first display panel LCP1, and polarizing plate POL1 shields color components of the leakage light after opposing substrate CF2 transmits the color components.

At this point, when pixel PIXb of second display panel LCP2 is put into the on state, second display panel LCP2 does not shield the backlight beam (white), but the backlight beam (white) is incident on first display panel LCP1. Because color filter layer FIL does not exist in white pixel PIXW, color (red, green, and blue) components of the backlight beam (white) incident on first display panel LCP1 are output to an outside as the leakage light. The color reproducibility is particularly degraded because of the leakage of the light having the high visual sensitivity. On the other hand, in the configuration of the second exemplary embodiment, the on and off states of white pixel PIXW and pixel PIXb, which are disposed in the one-to-one relationship, can be controlled independently of other pixels. Therefore, second display panel LCP2 shields the backlight beam (white), and polarizing plate POL1 of first display panel LCP1 shields each color component of the leakage light even if the light leakage occurs in second display panel LCP2, so that the color reproducibility can be improved.

Figure 17:
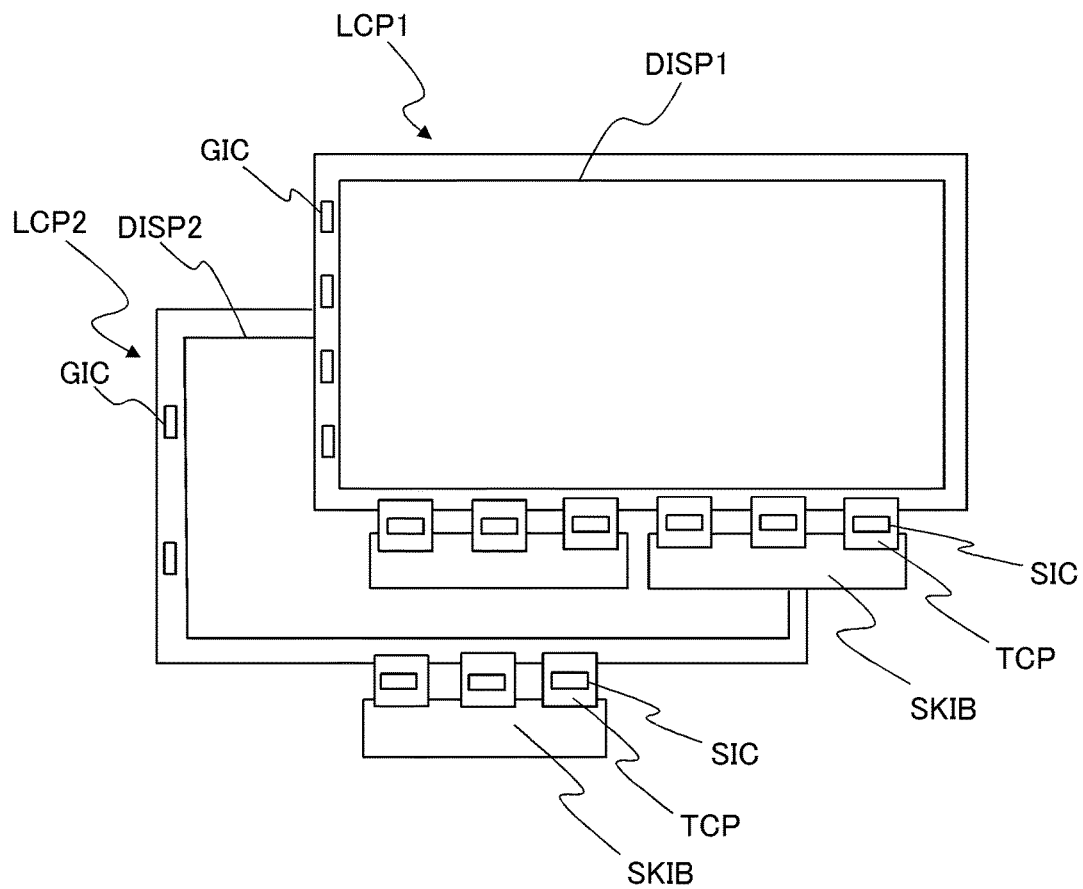
FIG. 17 is a view illustrating configurations of drivers of the first display panel and the second display panel.

FIG. 17 is a view illustrating configurations of drivers of first display panel LCP1 and second display panel LCP2. Six source driver ICs (SICs) are mounted on first display panel LCP1, and three source driver ICs (SICs) are mounted on second display panel LCP2. Therefore, the cost of liquid crystal display device LCD can be reduced because the number of source driver ICs of second display panel LCP2 can be decreased compared with first display panel LCP1.

Third Exemplary Embodiment

FIG. 18 is a plan view illustrating a schematic configuration of first display panel LCP1 according to a third exemplary embodiment, and FIG. 19 is a plan view illustrating a schematic configuration of second display panel LCP2 according to the third exemplary embodiment.

As illustrated in FIG. 18, in first display panel LCP1, a plurality of pixels PIX1 include red pixels PIXR, blue pixels PIXB, green pixels PIXG, and white pixels PIXW. Red pixel PIXR, blue pixel PIXB, green pixel PIXG, and white pixel PIXW are repeatedly arrayed in the row direction in this order, and pixels PIX1 having the identical color are arrayed in the column direction.

Similarly to the first exemplary embodiment, liquid crystal display device LCD of the third exemplary embodiment is configured such that the number of pixels PIX2 per unit area of second display panel LCP2 is smaller than the number of pixels PIX1 per unit area of first display panel LCP1. Specifically, in liquid crystal display device LCD, two pixels PIX1 of first display panel LCP1 and one pixel PIX2 (PIXa or PIXb) of second display panel LCP2 are disposed so as to correspond each other (overlap each other in plan view).

Figure 20A:
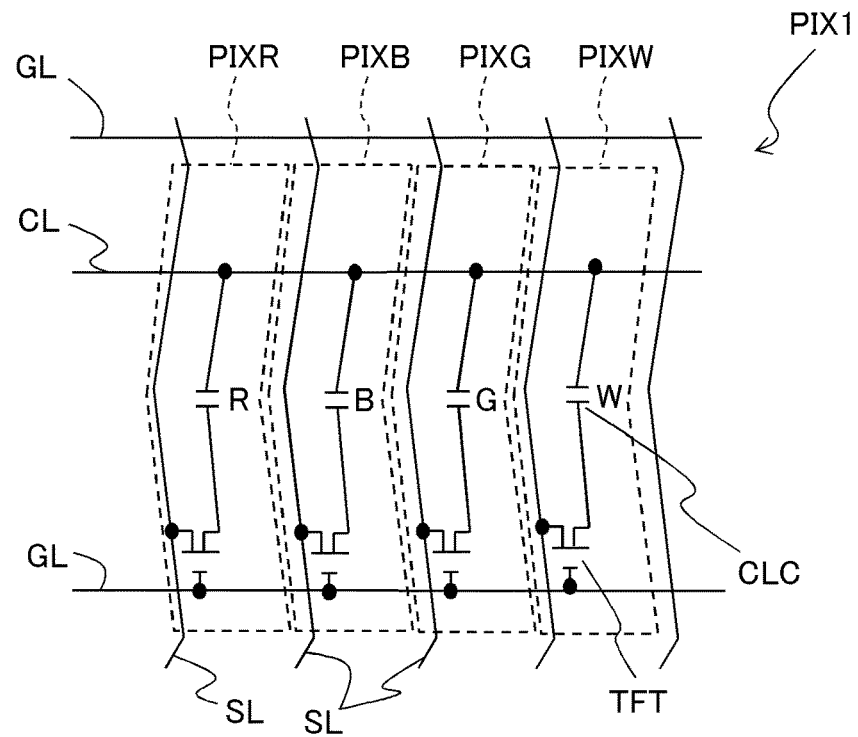
FIGS. 20A and 20B are plan views illustrating a relationship between pixels of the first display panel and pixels of the second display panel.
Figure 20B:
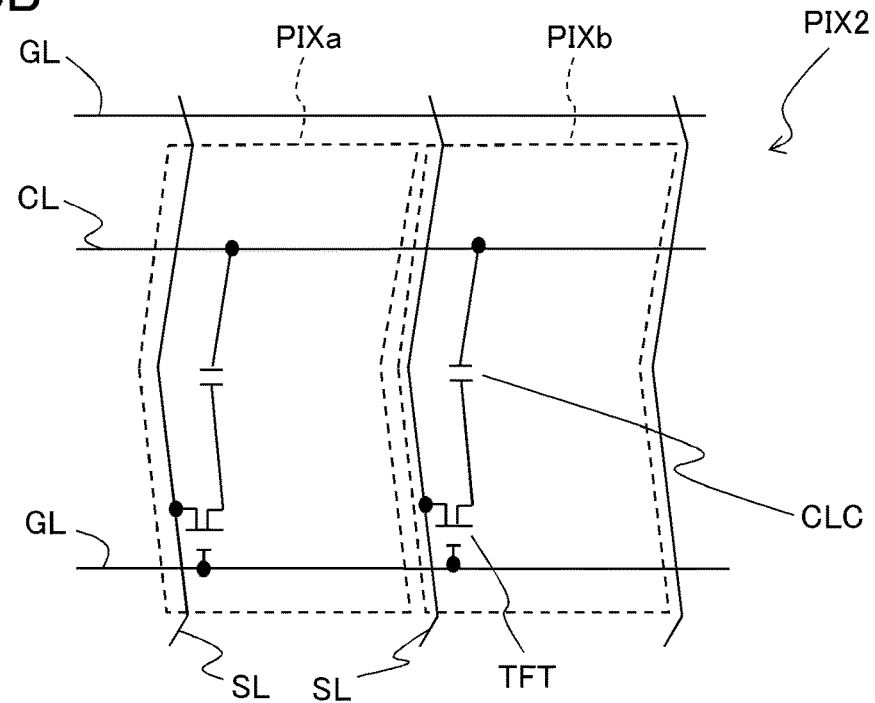
Figure 21A:
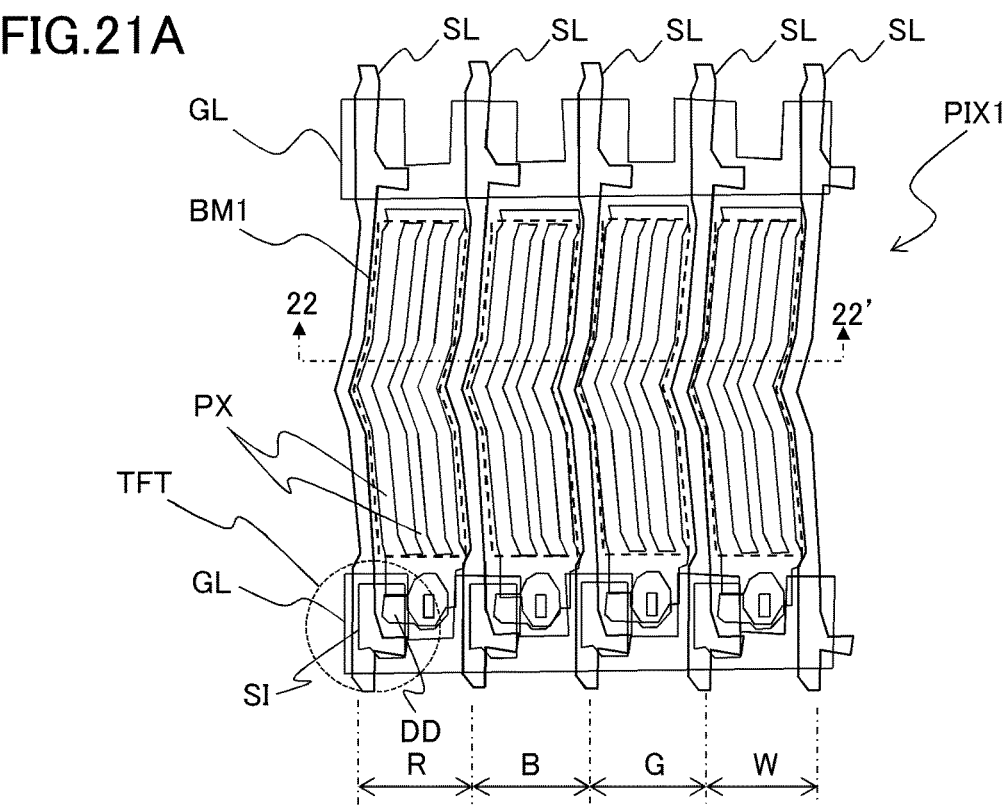
FIG. 21A is a plan view illustrating specific configurations of pixels corresponding to FIG. 20A.
Figure 21B:
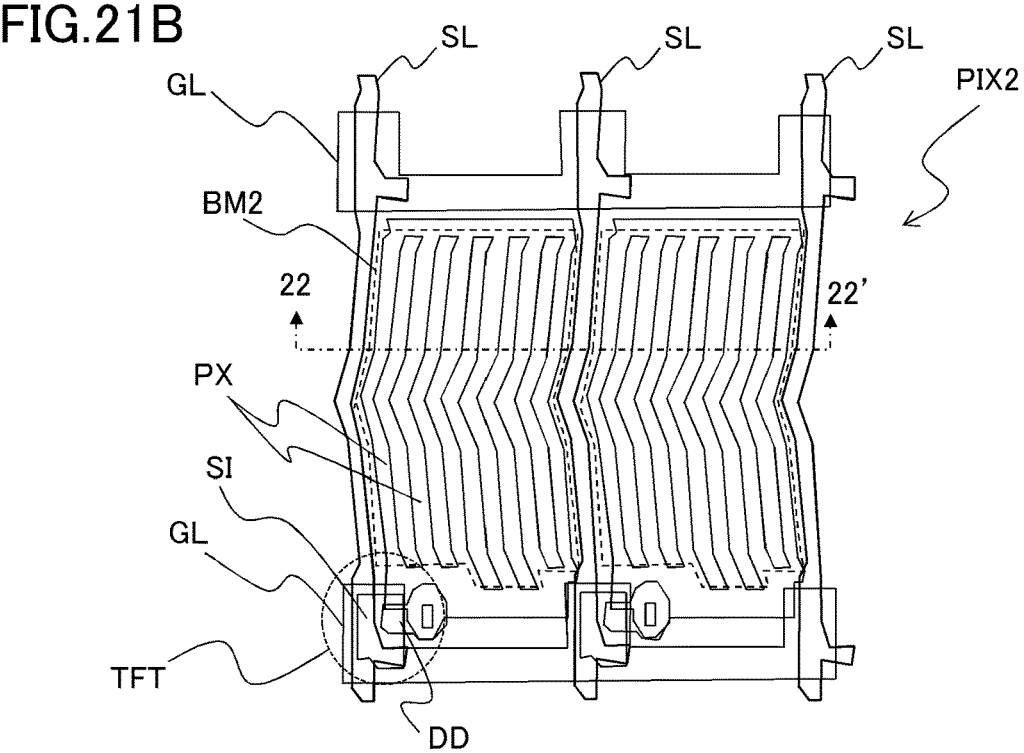
FIG. 21B is a plan view illustrating specific configurations of pixels corresponding to FIG. 20B.

FIGS. 20A and 20B are plan views illustrating a relationship between pixel PIX1 of first display panel LCP1 and pixel PIX2 of second display panel LCP2, which overlap each other. FIGS. 21A and 21B are plan views illustrating specific configurations of pixels PIX1 and PIX2 corresponding to FIGS. 20A and 20B. In an example of FIGS. 20A and 20B, one red pixel PIXR and one blue pixel PIXB of first display panel LCP1 and one pixel PIXa of second display panel LCP2 are overlapping each other in plan view, and one green pixel PIXG and one white pixel PIXW of first display panel LCP1 and one pixel PIXb of second display panel LCP2 are overlapping each other in plan view. In the case that pixels PIX1 of first display panel LCP1 are equal to each other in an area (size), the area of pixel PIXa or PIXb of second display panel LCP2 is double the area of one pixel PIX1 of first display panel LCP1. The area of pixel PIXa or PIXb is smaller than a total area of one red pixel PIXR, one blue pixel PIXB, one green pixel PIXG, and one white pixel PIXW.

Figure 22:
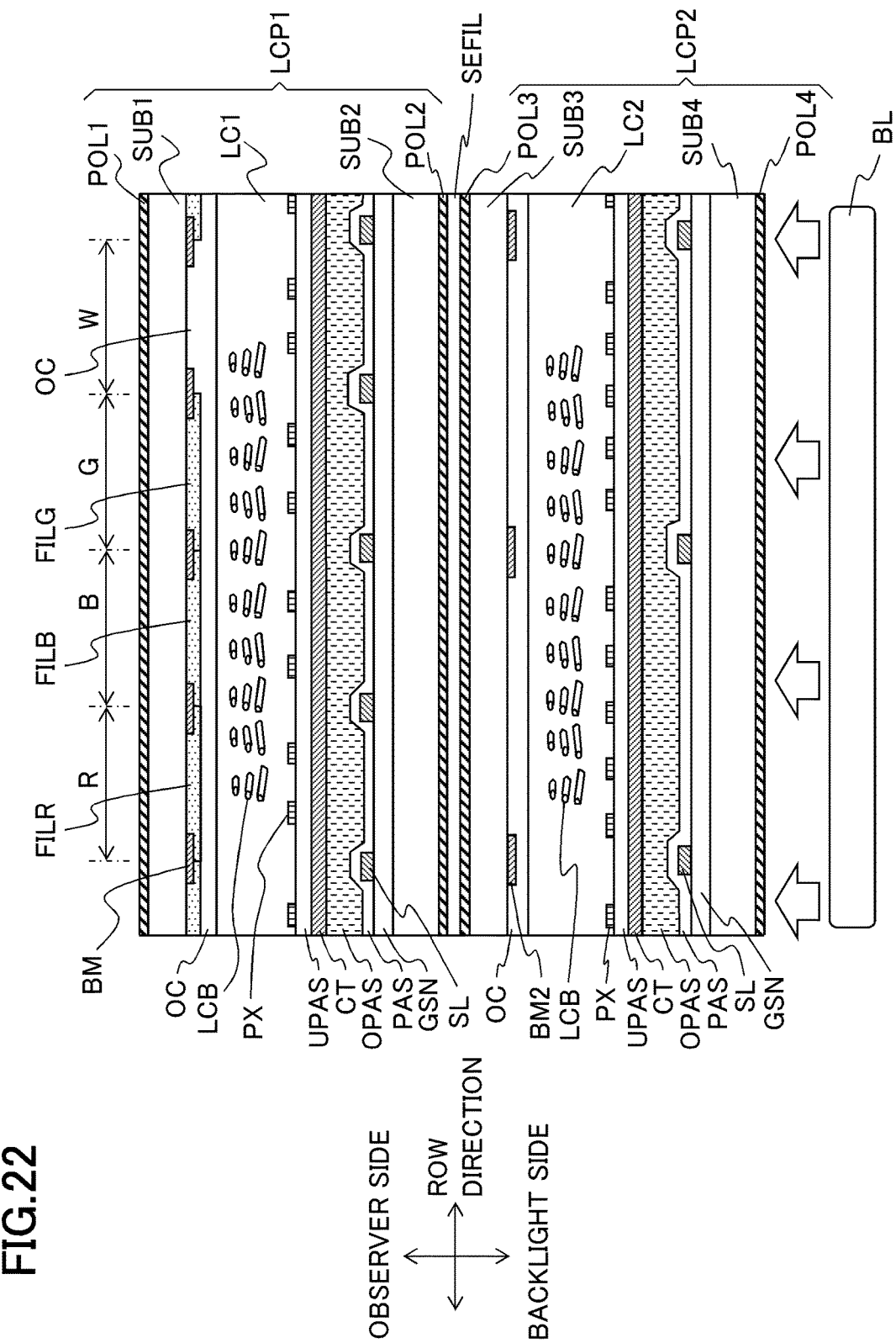
FIG. 22 is a sectional view taken along line 22-22' in FIGS. 21A and 21B.

FIG. 22 is a sectional view taken along line 22-22' in FIGS. 21A and 21B. The sectional structures of pixels PIX1 and PIX2 will be described below with reference to FIG. 22.

In opposing substrate CF1 of first display panel LCP1, red color filter layer FILR corresponding to red pixel PIXR, blue color filter layer FILB corresponding to blue pixel PIXB, and green color filter layer FILG corresponding to green pixel PIXG are formed, and not color filter layer FIL but overcoat film OC is formed in the portion corresponding to white pixel PIXW color.

In pixel PIX2 of second display panel LCP2, in plan view, source line SL and black matrix BM are formed in a portion overlapping a boundary between blue pixel PIXB and green pixel PIXG of first display panel LCP1 and a portion overlapping a boundary between white pixel PIXW and red pixel PIXR of first display panel LCP1, but source line SL and black matrix BM are formed in neither a portion overlapping a boundary between red pixel PIXR and blue pixel PIXB of first display panel LCP1 nor a portion overlapping a boundary between green pixel PIXG and white pixel PIXW of first display panel LCP1. That is, in second display panel LCP2, in plan view, source line SL is disposed at a boundary of a pixel group including green pixel PIXG and white pixel PIXW such that the pixel group is sandwiched between source lines SL.

In the third exemplary embodiment, one green pixel PIXG and one white pixel PIXW of first display panel LCP1 and one pixel PIX2 (pixel PIXb) of second display panel LCP2 are disposed while overlapping each other, and one red pixel PIXR and one blue pixel PIXB of first display panel LCP1 and one pixel PIX2 (pixel PIXa) of second display panel LCP2 are disposed while overlapping each other.

In the case that the blue monochrome image is displayed in the above configuration, green pixel PIXG and white pixel PIXW of first display panel LCP1 are put into the off state, and pixel PIXb of second display panel LCP2 is put into the off state. That is, the on and off states of the pixel group including high-luminance green pixel PIXG and high-luminance white pixel PIXW and the on and off states of pixel PIXb disposed in the one-to-one relationship with the pixel group can be controlled independently of other pixels. As can be seen from FIG. 9B and FIG. 16B, the leakage light from high-luminance green pixel PIXG and high-luminance white pixel PIXW are shielded. Accordingly, even if the light leakage occurs in second display panel LCP2, color filter layer FIL and polarizing plate POL1 of first display panel LCP1 shield each color component of the leakage light. Therefore, the color reproducibility can be improved.

In the third exemplary embodiment, the cost of liquid crystal display device LCD can also be reduced because the number of source driver ICs of second display panel LCP2 can be decreased compared with first display panel LCP1.

Fourth Exemplary Embodiment

Figure 23:
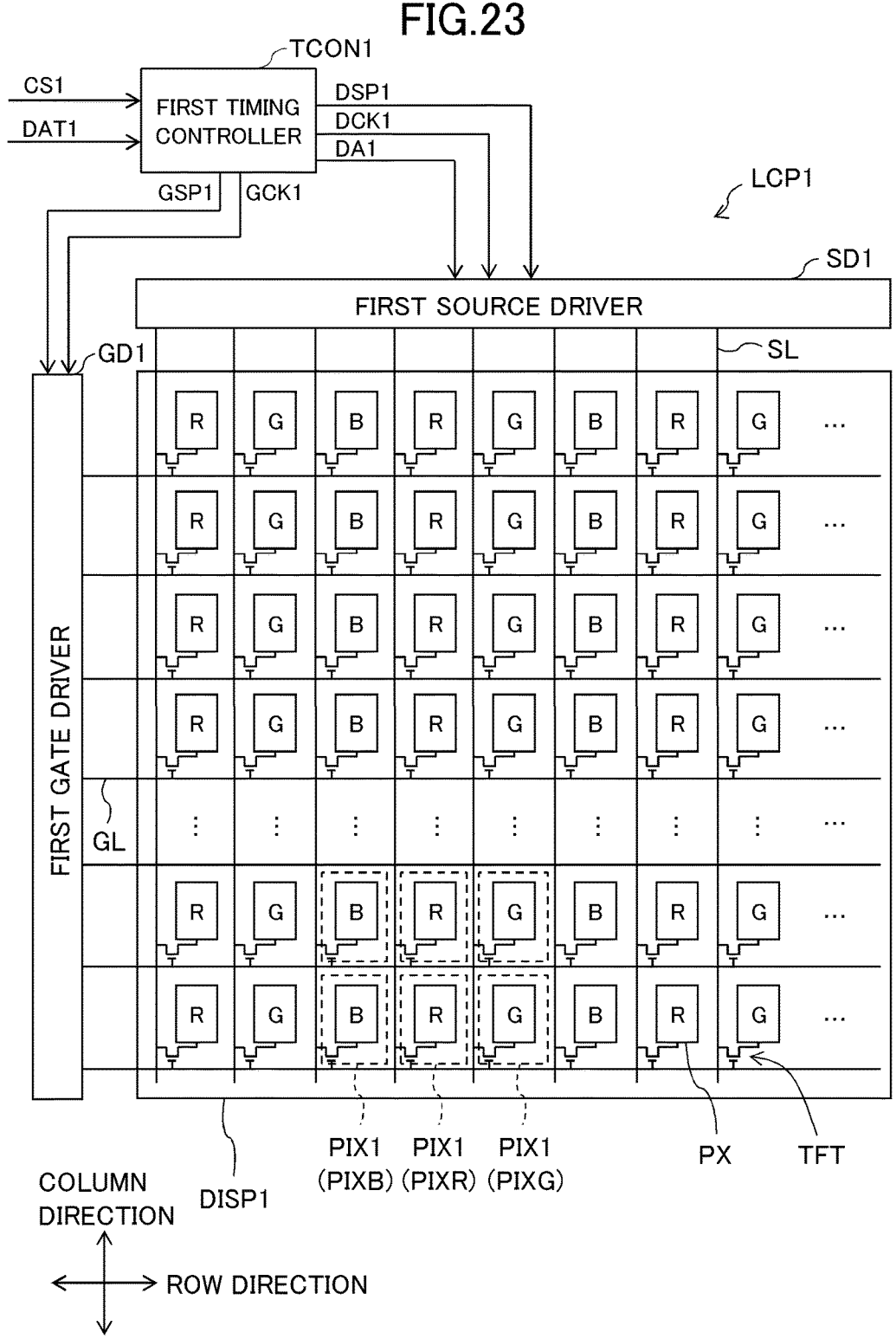
FIG. 23 is a plan view illustrating a schematic configuration of a first display panel according to a fourth exemplary embodiment.
Figure 24:
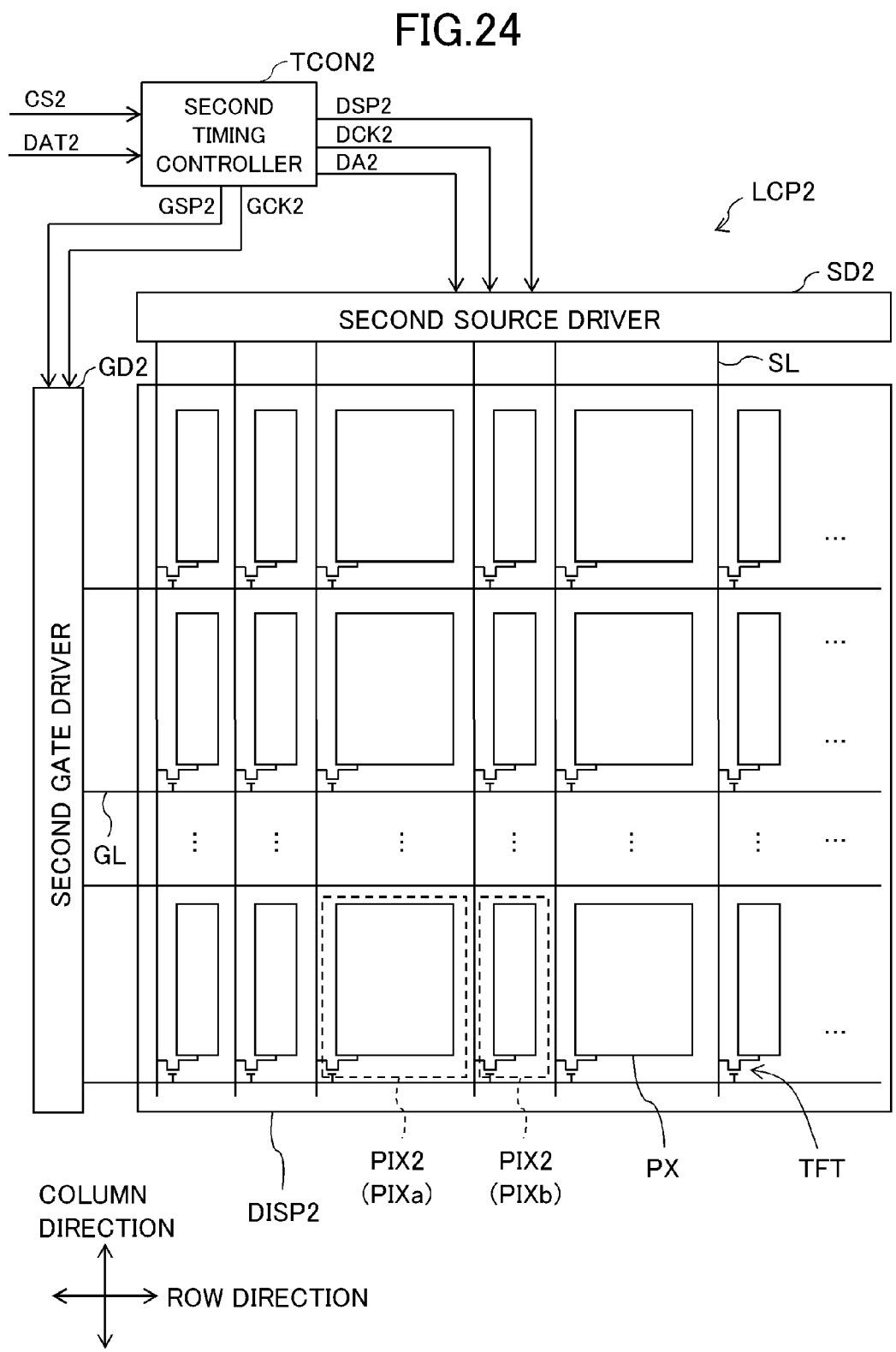
FIG. 24 is a plan view illustrating a schematic configuration of a second display panel according to the fourth exemplary embodiment.

FIG. 23 is a plan view illustrating a schematic configuration of first display panel LCP1 according to a fourth exemplary embodiment, and FIG. 24 is a plan view illustrating a schematic configuration of second display panel LCP2 according to the fourth exemplary embodiment.

As illustrated in FIG. 23, in first display panel LCP1, a plurality of pixels PIX1 include red pixels PIXR, green pixels PIXG, and blue pixels PIXB. Red pixel PIXR, green pixel PIXG, and blue pixel PIXB are repeatedly arrayed in the row direction in this order, and pixels PIX1 having the identical color are arrayed in the column direction.

Similarly to the first exemplary embodiment, liquid crystal display device LCD of the fourth exemplary embodiment is configured such that the number of pixels PIX2 per unit area of second display panel LCP2 is smaller than the number of pixels PIX1 per unit area of first display panel LCP1. Specifically, liquid crystal display device LCD includes a region where four pixels PIX1 (two-by-two pixel in the row and column directions) of first display panel LCP1 and one pixel PIX2 (PIXa) of second display panel LCP2 correspond to each other (overlap each other in plan view) and a region where two pixels PIX1 (one-by-two pixel in the row and column directions) of first display panel LCP1 and one pixel PIX2 (PIXb) of second display panel LCP2 correspond to each other (overlap each other in plan view).

Figure 25A:
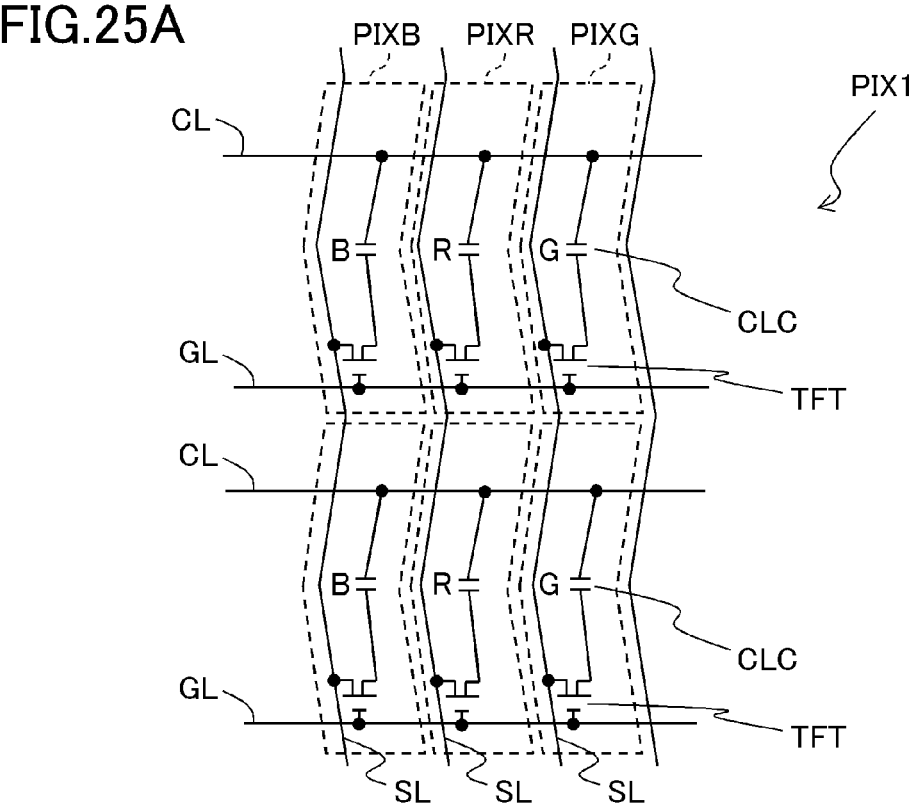
FIGS. 25A and 25B are plan views illustrating a relationship between pixels of the first display panel and pixels of the second display panel.
Figure 25B:
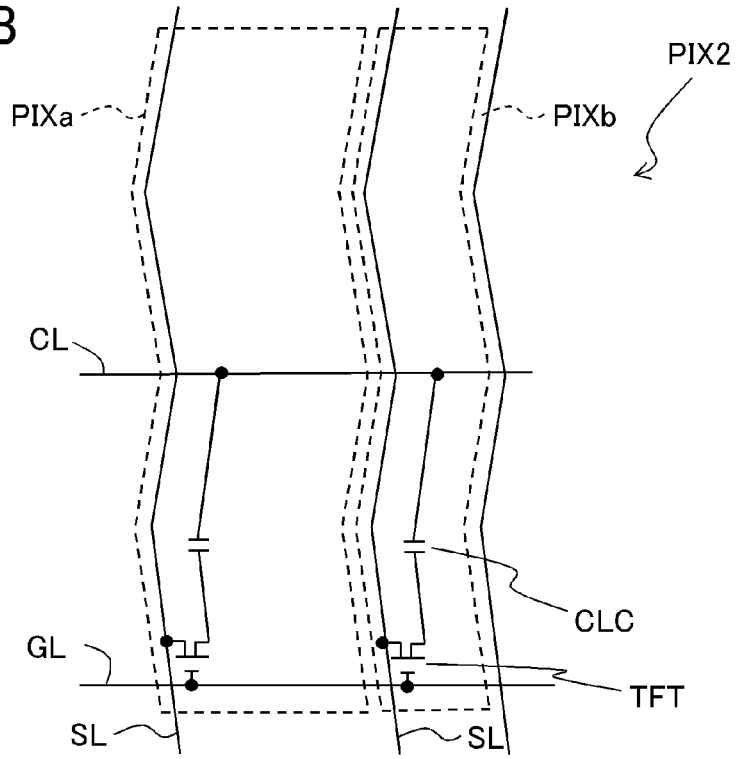

FIGS. 25A and 25B are plan views illustrating a relationship between pixel PIX1 of first display panel LCP1 and pixel PIX2 of second display panel LCP2, which overlap each other. In an example of FIGS. 25A and 25B, two blue pixels PIXB and two red pixels PIXR, each of which are adjacent to each other in the column direction of first display panel LCP1, and one pixel PIXa of second display panel LCP2 are disposed while overlapping each other in plan view, and two green pixels PIXG adjacent to each other in the column direction of first display panel LCP1 and one pixel PIXb of second display panel LCP2 are disposed while overlapping each other in plan view. In the case that pixels PIX1 of first display panel LCP1 are equal to each other in an area (size), the area of one pixel PIXa of second display panel LCP2 is quadruple the area of one pixel PIX1 of first display panel LCP1, and the area of one pixel PIXb of second display panel LCP2 is double the area of one pixel PIX1 of first display panel LCP1. The area of one pixel PIXa is equal to a total area of two red pixels PIXR and two blue pixels PIXB, and the area of one pixel PIXb is equal to a total area of two green pixels PIXG.

In the case that the blue monochrome image is displayed in the above configuration, similarly to the first exemplary embodiment, green pixel PIXG of first display panel LCP1 is put into the off state, and pixel PIXb of second display panel LCP2 is put into the off state. As illustrated in FIG. 9B, even if the light leakage occurs in second display panel LCP2, color filter layer FIL and polarizing plate POL1 of first display panel LCP1 can shield each color component of the leakage light, so that the color reproducibility can be improved.

In the fourth exemplary embodiment, the cost of liquid crystal display device LCD can also be reduced because the numbers of gate driver ICs and source driver ICs of second display panel LCP2 can be decreased compared with first display panel LCP1.

Fifth Exemplary Embodiment

Figure 26:
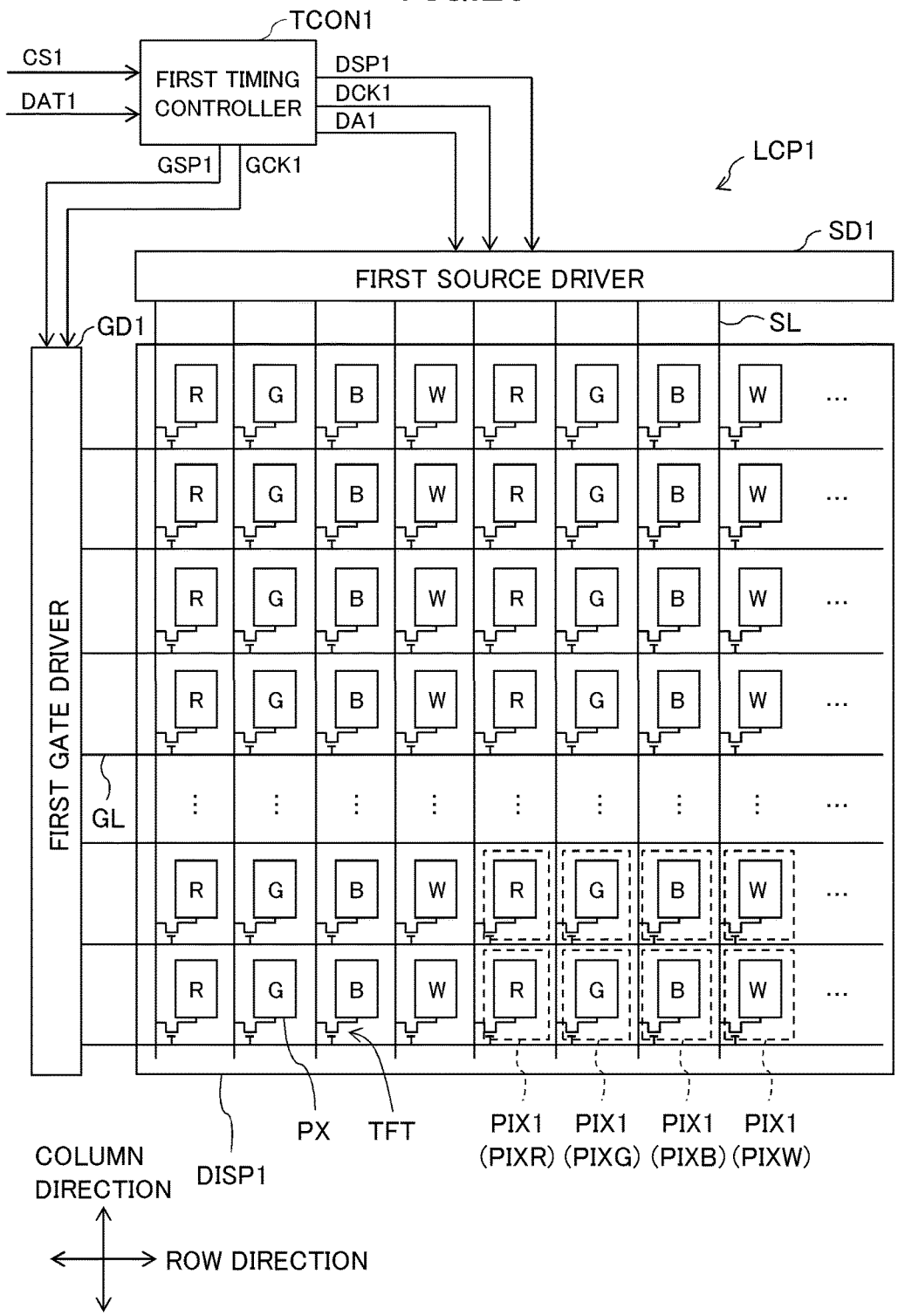
FIG. 26 is a plan view illustrating a schematic configuration of a first display panel according to a fifth exemplary embodiment.

FIG. 26 is a plan view illustrating a schematic configuration of first display panel LCP1 according to a fifth exemplary embodiment, and FIG. 27 is a plan view illustrating a schematic configuration of second display panel LCP2 according to the fifth exemplary embodiment.

As illustrated in FIG. 26, in first display panel LCP1, a plurality of pixels PIX1 include red pixels PIXR, green pixels PIXG, blue pixels PIXB, and white pixels PIXW. Red pixel PIXR, green pixel PIXG, blue pixel PIXB, and white pixel PIXW are repeatedly arrayed in the row direction in this order, and pixels PIX1 having the identical color are arrayed in the column direction.

Similarly to the first exemplary embodiment, liquid crystal display device LCD of the fifth exemplary embodiment is configured such that the number of pixels PIX2 per unit area of second display panel LCP2 is smaller than the number of pixels PIX1 per unit area of first display panel LCP1. Specifically, liquid crystal display device LCD includes a region where six pixels PIX1 (three-by-two pixel in the row and column directions) of first display panel LCP1 and one pixel PIX2 (PIXa) of second display panel LCP2 correspond to each other (overlap each other in plan view) and a region where two pixels PIX1 (one-by-two pixel in the row and column directions) of first display panel LCP1 and one pixel PIX2 (PIXb) of second display panel LCP2 correspond to each other (overlap each other in plan view).

Figure 28A:
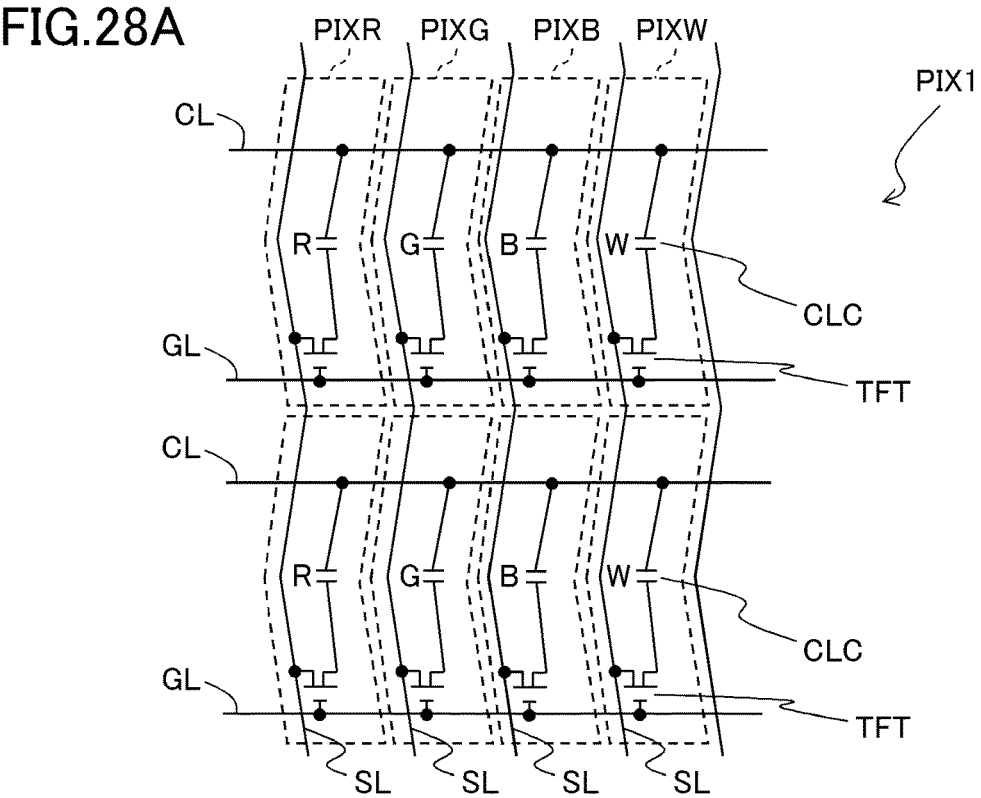
FIGS. 28A and 28B are plan views illustrating a relationship between pixels of the first display panel and pixels of the second display panel.
Figure 28B:
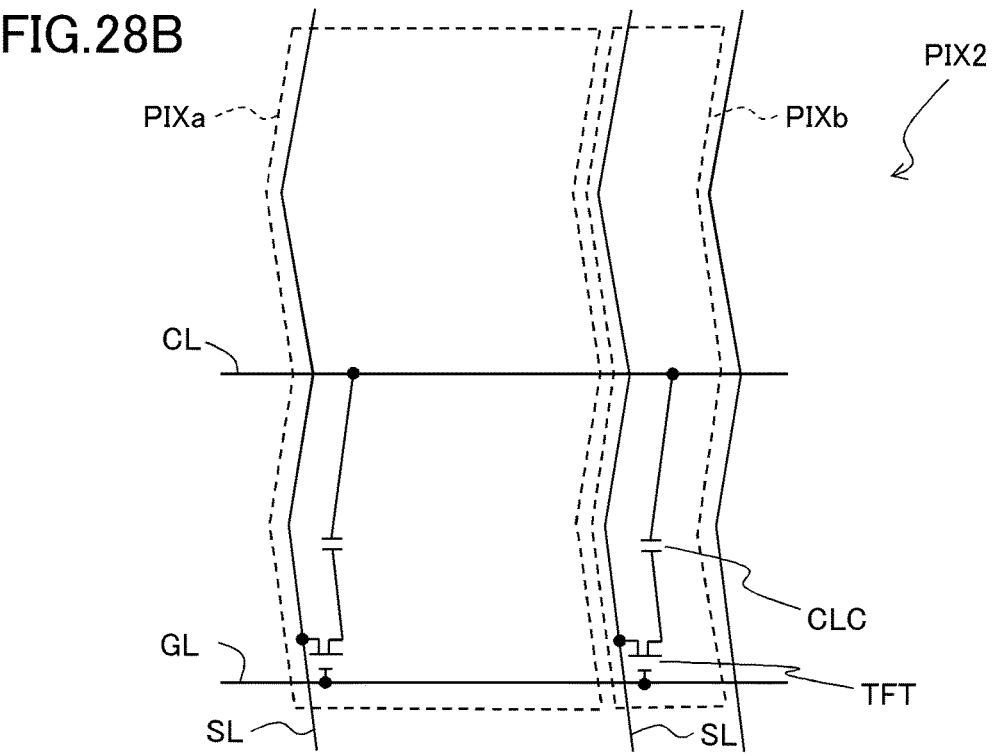

FIGS. 28A and 28B are plan views illustrating a relationship between pixel PIX1 of first display panel LCP1 and pixel PIX2 of second display panel LCP2, which overlap each other. In an example of FIGS. 28A and 28B, two red pixels PIXR, two green pixels PIXG, and two blue pixels PIXB, each of which are adjacent to each other in the column direction of first display panel LCP1, and one pixel PIXa of second display panel LCP2 are overlapping each other in plan view, and two white pixels PIXW adjacent to each other in the column direction of first display panel LCP1 and one pixel PIXb of second display panel LCP2 are overlapping each other in plan view. In the case that pixels PIX1 of first display panel LCP1 are equal to each other in an area (size), the area of one pixel PIXa of second display panel LCP2 is six times the area of one pixel PIX1 of first display panel LCP1, and the area of one pixel PIXb of second display panel LCP2 is double the area of one pixel PIX1 of first display panel LCP1. The area of one pixel PIXa is equal to a total area of two red pixels PIXR, two green pixels PIXG, and two blue pixels PIXB, and the area of one pixel PIXb is equal to a total area of two white pixels PIXW.

In the case that the blue monochrome image is displayed in the above configuration, similarly to the second exemplary embodiment, white pixel PIXW of first display panel LCP1 is put into the off state, and pixel PIXb of second display panel LCP2 is put into the off state. As illustrated in FIG. 16B, even if the light leakage occurs in second display panel LCP2, polarizing plate POL1 of first display LCP1 can shield each color component of the leakage light, so that the color reproducibility can be improved.

In the fifth exemplary embodiment, the cost of liquid crystal display device LCD can also be reduced because the numbers of gate driver ICs and source driver ICs of second display panel LCP2 can be decreased compared with first display panel LCP1.

Sixth Exemplary Embodiment

Figure 30:
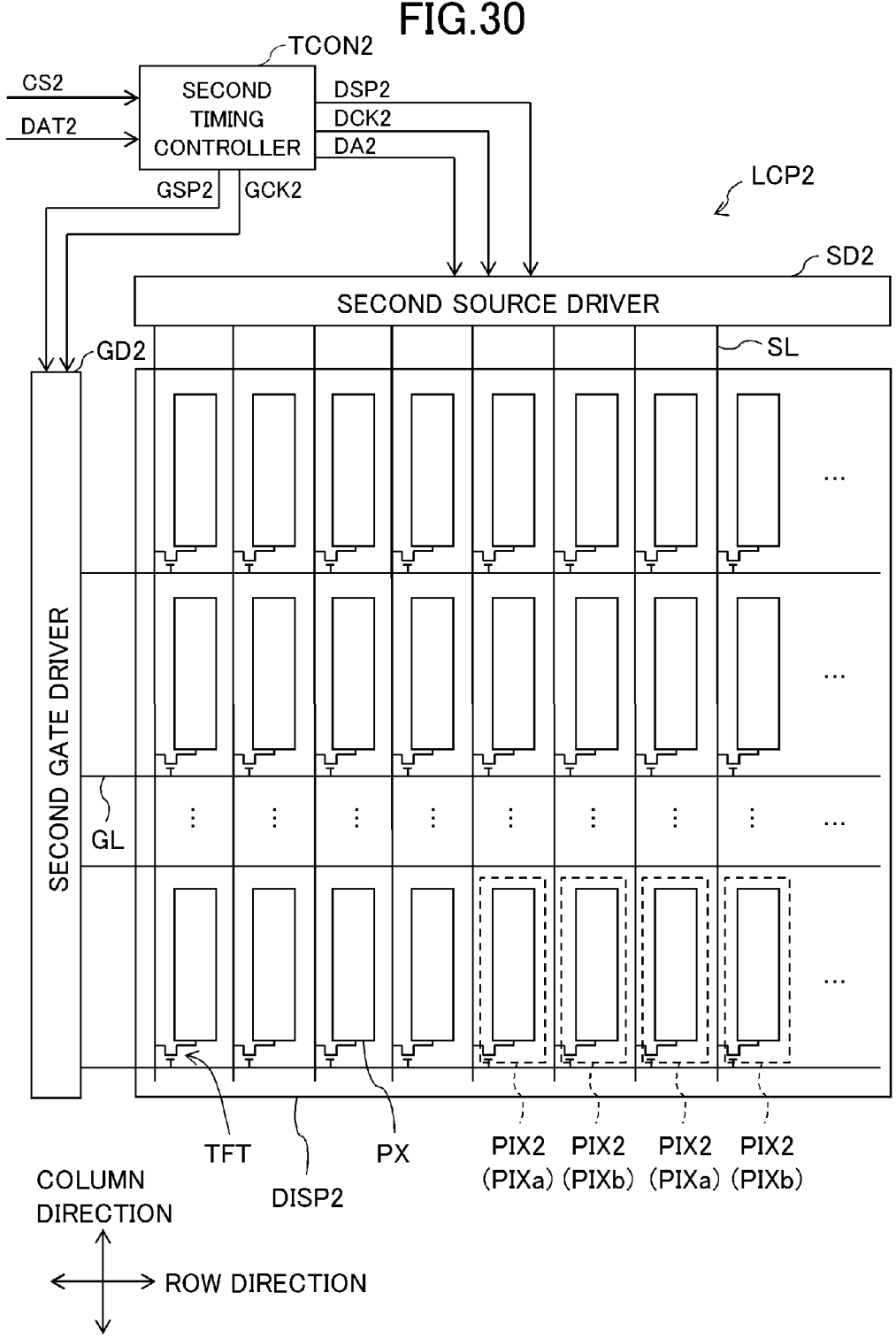
FIG. 30 is a plan view illustrating a schematic configuration of a second display panel according to the sixth exemplary embodiment.

FIG. 29 is a plan view illustrating a schematic configuration of first display panel LCP1 according to a sixth exemplary embodiment, and FIG. 30 is a plan view illustrating a schematic configuration of second display panel LCP2 according to the sixth exemplary embodiment.

As illustrated in FIG. 29, in first display panel LCP1, a plurality of pixels PIX1 include red pixels PIXR, green pixels PIXG, blue pixels PIXB, and white pixels PIXW. Red pixel PIXR, green pixel PIXG, blue pixel PIXB, and white pixel PIXW are repeatedly arrayed in the row direction in this order. In the column direction, red pixel PIXR and blue pixel PIXB are alternately arrayed in one of two columns adjacent to each other, and green pixel PIXG and white pixel PIXW are alternately arrayed in the other column.

Similarly to the first exemplary embodiment, liquid crystal display device LCD of the sixth exemplary embodiment is configured such that the number of pixels PIX2 per unit area of second display panel LCP2 is smaller than the number of pixels PIX1 per unit area of first display panel LCP1. Specifically, liquid crystal display device LCD includes a region where two pixels PIX1 (one-by-two pixel in the row and column directions) of first display panel LCP1 and one pixel PIX2 (PIXa) of second display panel LCP2 correspond to each other (overlap each other in plan view) and a region where two pixels PIX1 (one-by-two pixel in the row and column directions) of first display panel LCP1 and one pixel PIX2 (PIXb) of second display panel LCP2 correspond to each other (overlap each other in plan view).

Figure 31A:
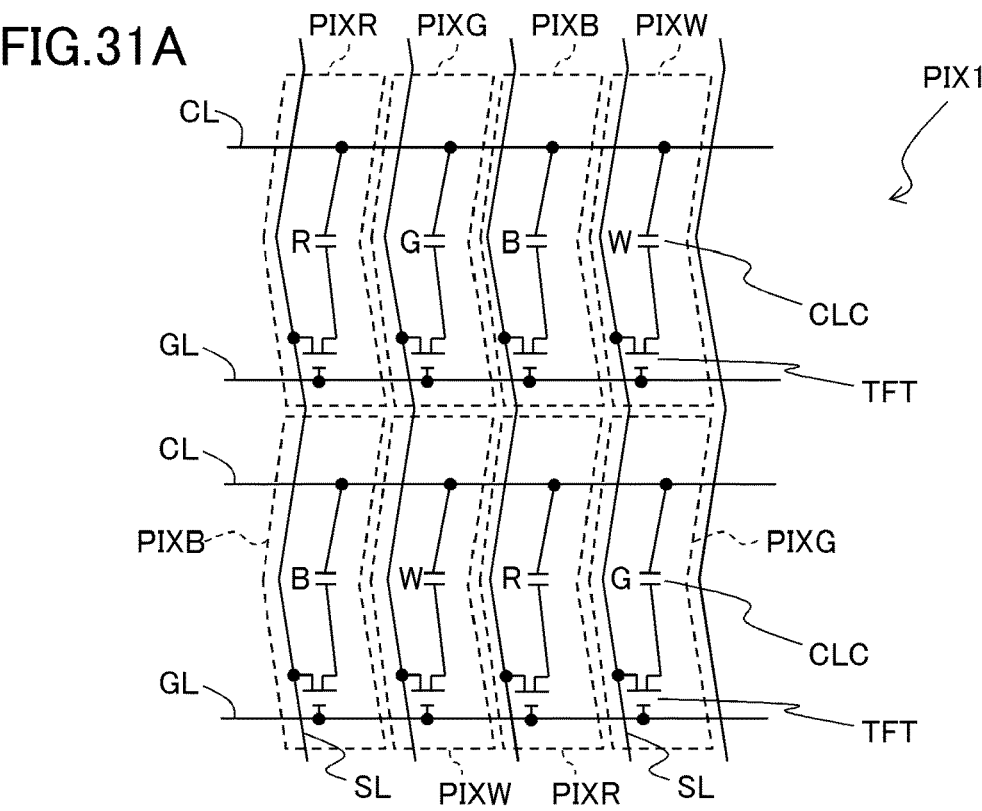
FIGS. 31A and 31B are plan views illustrating a relationship between pixels of the first display panel and pixels of the second display panel.
Figure 31B:
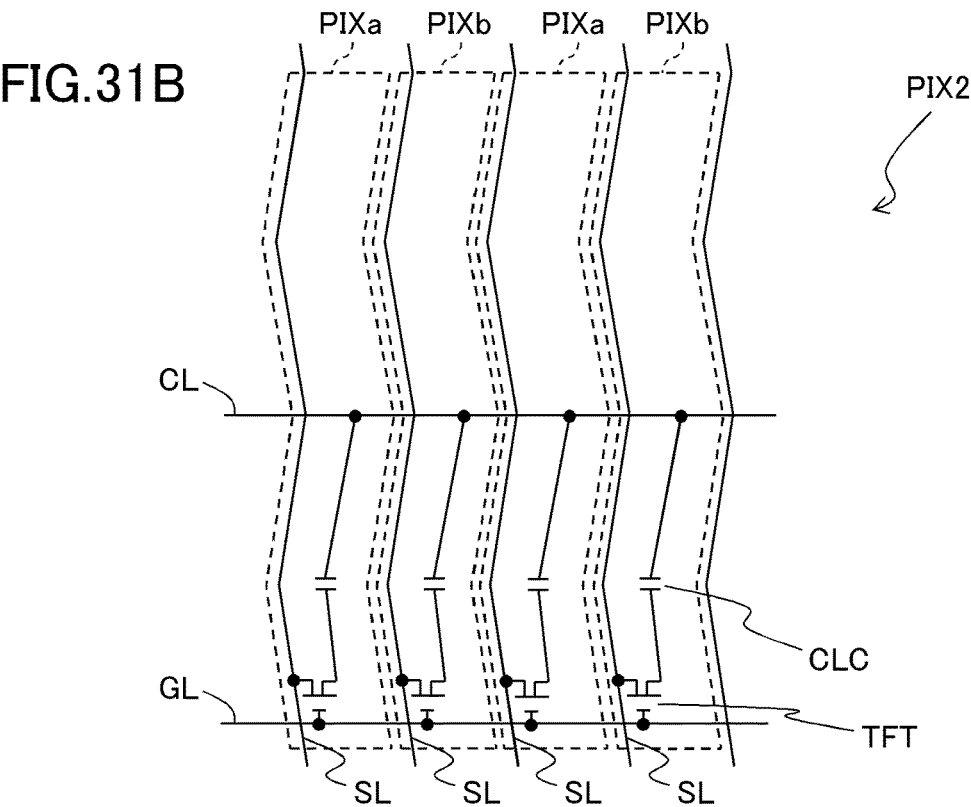

FIGS. 31A and 31B are plan views illustrating a relationship between pixel PIX1 of first display panel LCP1 and pixel PIX2 of second display panel LCP2, which overlap each other. In an example of FIGS. 31A and 31B, one red pixel PIXR and one blue pixel PIXB of first display panel LCP1 and one pixel PIXa of second display panel LCP2 are disposed while overlapping each other in plan view, and one green pixel PIXG and one white pixel PIXW of first display panel LCP1 and one pixel PIXb of second display panel LCP2 are disposed while overlapping each other in plan view. In the case that pixels PIX1 of first display panel LCP1 are equal to each other in an area (size), the area of one pixel PIXa of second display panel LCP2 and the area of one pixel PIXb of second display panel LCP2 are double the area of one pixel PIX1 of first display panel LCP1. The area of pixel PIXa or PIXb is smaller than a total area of one red pixel PIXR, one blue pixel PIXB, one green pixel PIXG, and one white pixel PIXW.

In the case that the blue monochrome image is displayed in the above configuration, similarly to the third exemplary embodiment, green pixel PIXG and white pixel PIXW of first display panel LCP1 are put into the off state, and pixel PIXb of second display panel LCP2 is put into the off state. That is, the on and off states of the pixel group including high-luminance green pixel PIXG and high-luminance white pixel PIXW and the on and off states of pixel PIXb disposed in the one-to-one relationship with the pixel group can be controlled independently of other pixels. Similarly to the third exemplary embodiment, even if the light leakage occurs in second display panel LCP2, color filter layer FIL and polarizing plate POL1 of first display panel LCP1 can shield each color component of the leakage light, so that the color reproducibility can be improved.

In the sixth exemplary embodiment, the cost of liquid crystal display device LCD can be reduced because the number of gate driver ICs of second display panel LCP2 can be decreased compared with first display panel LCP1.

Seventh Exemplary Embodiment

FIG. 32 is a plan view illustrating a schematic configuration of first display panel LCP1 according to a seventh exemplary embodiment, and FIG. 33 is a plan view illustrating a schematic configuration of second display panel LCP2 according to the seventh exemplary embodiment.

As illustrated in FIG. 32, in first display panel LCP1, a plurality of pixels PIX1 include red pixels PIXR, blue pixels PIXB, green pixels PIXG, and white pixels PIXW. Red pixel PIXR, blue pixel PIXB, green pixel PIXG, white pixel PIXW, white pixel PIXW, green pixel PIXG, blue pixel PIXB, and red pixel PIXR are repeatedly arrayed in the row direction in this order. When the array of the plurality of pixels PIX1 in the row direction is expressed in color order, pixel groups each of which has "RBGWWGBR" are arrayed in the row direction. Pixels PIX1 having the identical color are arrayed in the column direction. A first pixel group including two green pixels PIXG and two white pixels PIXW and a second pixel group including two red pixels PIXR and two blue pixels PIXB are alternately arrayed.

Similarly to the first exemplary embodiment, liquid crystal display device LCD of the seventh exemplary embodiment is configured such that the number of pixels PIX2 per unit area of second display panel LCP2 is smaller than the number of pixels PIX1 per unit area of first display panel LCP1. Specifically, in liquid crystal display device LCD, four pixels PIX1 of first display panel LCP1 and one pixel PIX2 (PIXa or PIXb) of second display panel LCP2 are disposed so as to correspond each other (overlap each other in plan view).

Figure 34A:
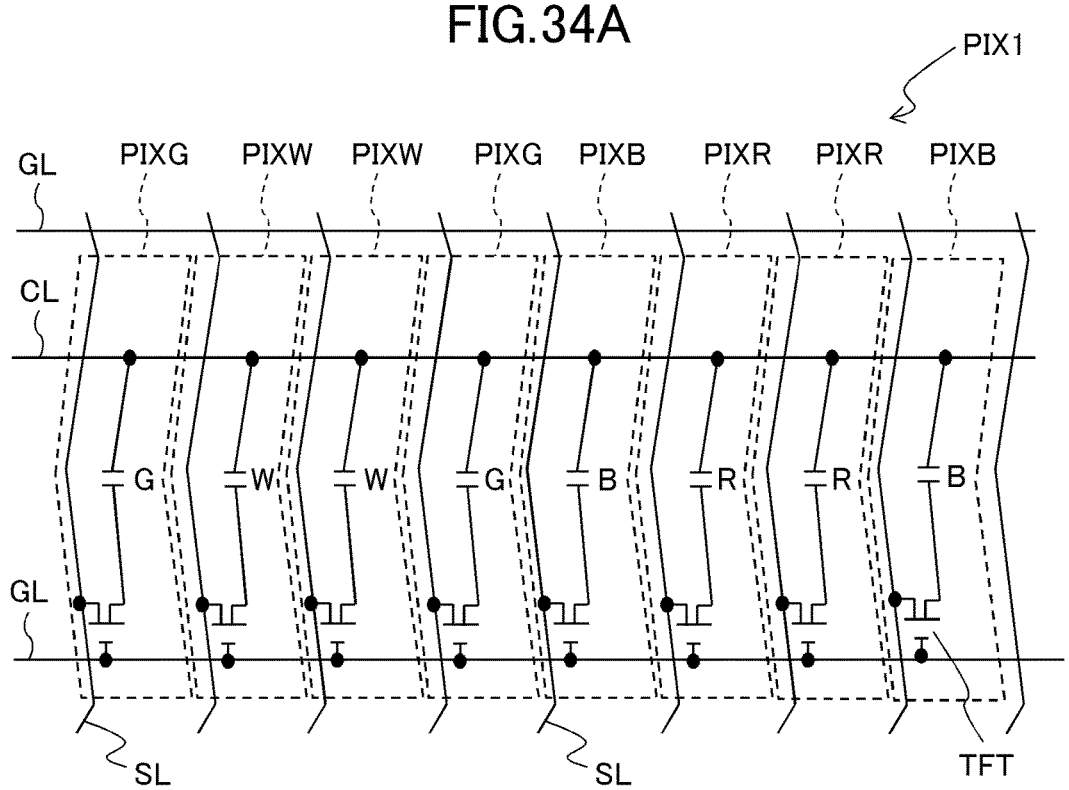
FIGS. 34A and 34B are plan views illustrating a relationship between pixels of the first display panel and pixels of the second display panel.
Figure 34B:
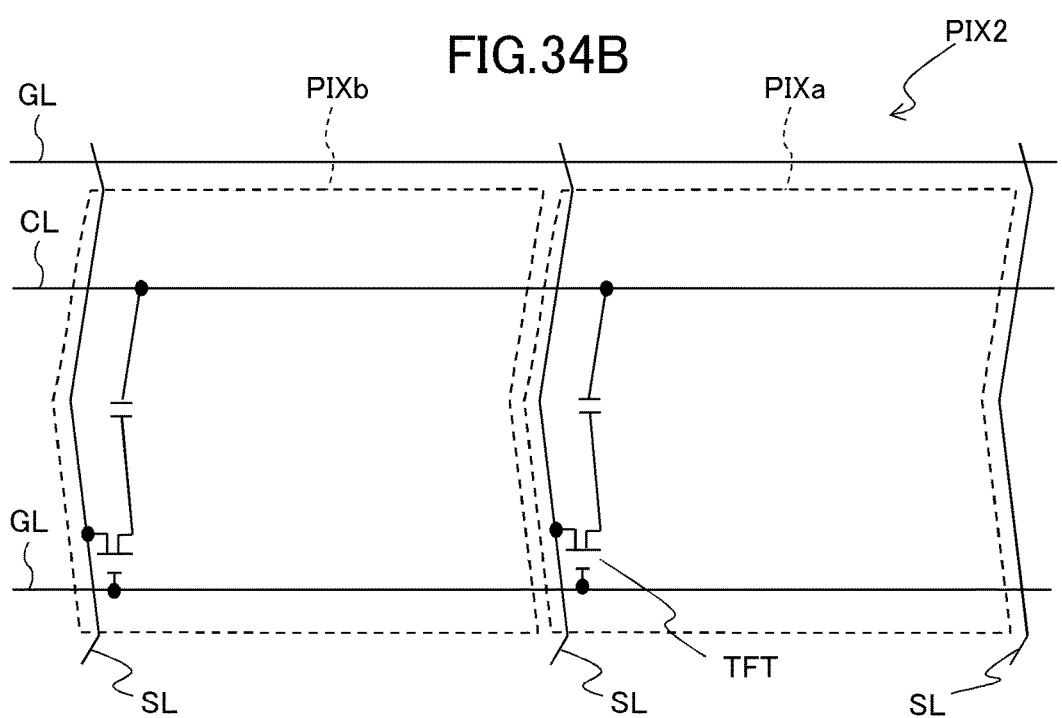

FIGS. 34A and 34B are plan views illustrating a relationship between pixel PIX1 of first display panel LCP1 and pixel PIX2 of second display panel LCP2, which overlap each other. In an example of FIGS. 34A and 34B, two red pixels PIXR adjacent to each other in the row direction and two blue pixels PIXB (four pixels of "BRRB", namely, the second pixel group) of first display panel LCP1, and one pixel PIXa of second display panel LCP2 are disposed such that two red pixels PIXR and two blue pixels PIXB overlap one pixel PIXa in plan view, and two white pixels PIXW adjacent to each other in the row direction and two green pixels PIXG (four pixels of "GWWG", namely, the first pixel group) of first display panel LCP1, and one pixel PIXb of second display panel LCP2 are disposed such that two white pixels PIXW and two green pixels PIXG overlap one pixel PIXb in plan view. In the case that pixels PIX1 of first display panel LCP1 are equal to each other in an area (size), the area of pixel PIXa or PIXb of second display panel LCP2 is quadruple the area of one pixel PIX1 of first display panel LCP1. The area of pixel PIXa is equal to the area of pixel PIXb.

In the case that the blue monochrome image is displayed in the above configuration, similarly to the third exemplary embodiment, green pixel PIXG and white pixel PIXW of first display panel LCP1 are put into the off state, and pixel PIXb of second display panel LCP2 is put into the off state.

That is, the on and off states of the pixel group including high-luminance green pixel PIXG and high-luminance white pixel PIXW and the on and off states of pixel PIXb disposed in the one-to-one relationship with the pixel group can be controlled independently of other pixels. Similarly to the third exemplary embodiment, even if the light leakage occurs in second display panel LCP2, color filter layer FIL and polarizing plate POL1 of first display panel LCP1 can shield each color component of the leakage light, so that the color reproducibility can be improved.

In the seventh exemplary embodiment, the cost of liquid crystal display device LCD can further be reduced because the number of source driver ICs of second display panel LCP2 can be decreased compared with first display panel LCP1.

Although the exemplary embodiments of the present disclosure are described above, the present disclosure is not limited to the exemplary embodiments. Needless to say, various modifications of the exemplary embodiments made appropriately by those in the art without departing from the scope of the present disclosure are also included in the technical scope of the present disclosure. For example, in the third exemplary embodiment, one pixel PIX2 (pixel PIXa) of second display panel LCP2 (see FIG. 19) and two pixels (two red pixels PIXR and two blue pixels PIXB) adjacent to each other in the column direction of first display panel LCP1 may overlap each other, and one pixel PIX2 (pixel PIXb) and two pixels (two green pixels PIXG and two white pixels PIXW) adjacent to each other in the column direction of first display panel LCP1 may overlap each other. Additionally, the exemplary embodiments may be combined with each other. The independently-controlled pixel may be the red pixel or the blue pixel.

Figure 35:
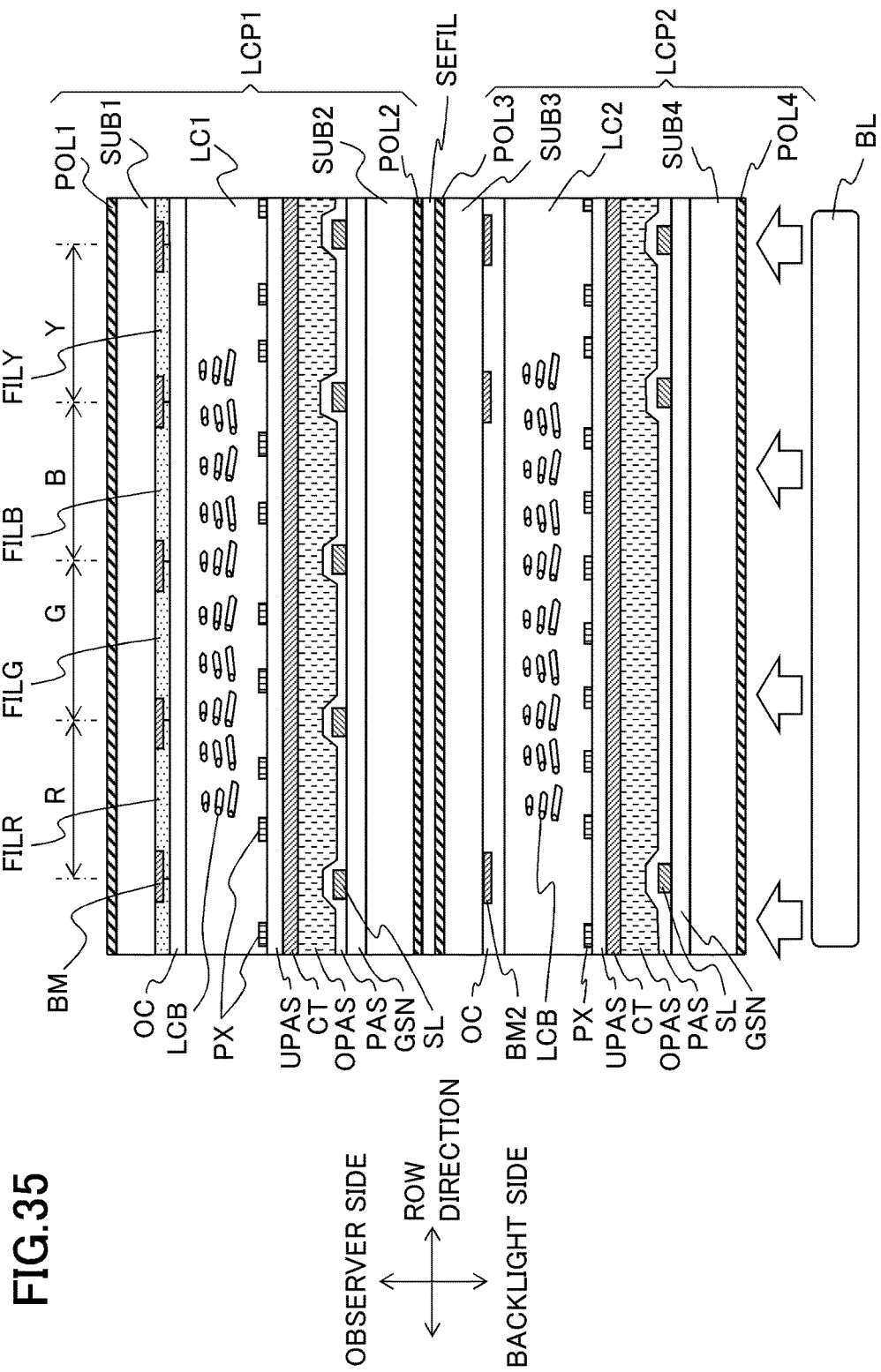
FIG. 35 illustrates an example in which white pixels of the second exemplary embodiment is replaced with yellow pixels.

In the second, third, and fifth to seventh exemplary embodiments, red pixel PIXR, green pixel PIXG, blue pixel PIXB, and white pixel PIXW are disposed in first display panel LCP1 by way of example. However, the identical structure and effect can be obtained when yellow pixel PIXY is disposed instead of white pixel PIXW. FIG. 35 illustrates an example in which white pixel PIXW of the second exemplary embodiment is replaced with yellow pixel PIXY. That is, as illustrated in FIG. 35, in first display panel LCP1, a plurality of pixels PIX1 include red pixels PIXR, green pixels PIXG, blue pixels PIXB, and yellow pixels PIXY. Red pixel PIXR, green pixel PIXG, blue pixel PIXB, and yellow pixel PIXY are repeatedly arrayed in the row direction in this order, and pixels PIX1 having the identical color are arrayed in the column direction. One red pixel PIXR, one green pixel PIXG, and one blue pixel PIXB of first display panel LCP1 and one pixel PIXa of second display panel LCP2 are disposed while overlapping each other in plan view, and one yellow pixel PIXY of first display panel LCP1 and one pixel PIXb of second display panel LCP2 are disposed while overlapping each other in plan view.

In the example of FIG. 15, on opposing substrate CF1 of first display panel LCP1, color filter layer FIL is not formed in the portion (white portion) corresponding to white pixel PIXW, but overcoat film OC is formed. On the other hand, in the example of FIG. 35, yellow color filter layer FILY (yellow portion) corresponding to yellow pixel PIXY is formed, and then coated with overcoat film OC. Yellow color filter layer FILY is made of a yellow (Y color) material, and transmits yellow light.

In the above, the specific embodiments of the present application have been described, but the present application is not limited to the above-mentioned embodiments, and various modifications may be made as appropriate without departing from the spirit of the present application.

What is claimed is:

1. A liquid crystal display device comprising:
a first display panel that displays a color image, the first display panel including a plurality of transmission sections each of which transmits light having a predetermined color; and
a second display panel that displays a black-and-white image, wherein
each of the first display panel and the second display panel includes a plurality of pixels, the plurality of pixels being defined by two source lines adjacent to each other and two gate lines adjacent to each other in plan view,
the plurality of pixels of the first display panel include a first pixel corresponding to a first transmission section transmitting light having first color, a second pixel corresponding to a second transmission section transmitting light having second color, and a third pixel corresponding to a third transmission section transmitting light having third color,
the plurality of pixels of the second display panel include a fourth pixel overlapping the first pixel and a fifth pixel overlapping the second pixel and the third pixel, and
an area of the fourth pixel is different from an area of the fifth pixel.

2. The liquid crystal display device according to claim 1, wherein the area of the fourth pixel is equal to an area of the first pixel, and the area of the fifth pixel is equal to or larger than a total area of the second pixel and the third pixel.

3. The liquid crystal display device according to claim 1, wherein the first display panel further includes a sixth pixel corresponding to a fourth transmission section transmitting light having fourth color,
the first transmission section transmits white light, and
the fifth pixel overlaps the second pixel, the third pixel, and the sixth pixel.

4. The liquid crystal display device according to claim 3, wherein the area of the fourth pixel is equal to an area of the first pixel, and
the area of the fifth pixel is equal to a total area of the second pixel, the third pixel, and the sixth pixel.

5. The liquid crystal display device according to claim 1, wherein the first transmission section transmits green, yellow, or white light, and
the fourth pixel overlaps a plurality of the first pixels adjacent to each other in at least one of a first direction in which the source lines extend and a second direction in which the gate lines extend.

6. The liquid crystal display device according to claim 1, wherein the first transmission section transmits green, yellow, or white light.

7. The liquid crystal display device according to claim 1, wherein the number of pixels per unit area in the second display panel is smaller than the number of pixels per unit area in the first display panel.

8. A liquid crystal display device comprising:
a first display panel that displays a color image, the first display panel including a plurality of transmission sections each of which transmits light having a predetermined color; and
a second display panel that displays a black-and-white image, wherein
each of the first display panel and the second display panel includes a plurality of pixels, the plurality of pixels being defined by two source lines adjacent to each other and two gate lines adjacent to each other in plan view, the plurality of pixels of the first display panel include a first pixel corresponding to a first transmission section transmitting light having first color, a second pixel corresponding to a second transmission section transmitting light having second color, a third pixel corresponding to a third transmission section transmitting light having third color, and a fourth pixel corresponding to a fourth transmission section transmitting light having fourth color, the plurality of pixels of the second display panel include a fifth pixel overlapping the first pixel and the second pixel and a sixth pixel overlapping the third pixel and the fourth pixel, an area of the fifth pixel is smaller than a total area of the first pixel, the second pixel, the third pixel and the fourth pixel, and an area of the sixth pixel is smaller than a total area of the first pixel, the second pixel, the third pixel and the fourth pixel.

9. The liquid crystal display device according to claim 8, wherein, in the first display panel, the first pixel and the second pixel are arrayed adjacent to each other in a first direction in which the source lines extend or a second direction in which the gate lines extend.

10. The liquid crystal display device according to claim 8, wherein each of the first transmission section and the second transmission section transmits green, yellow, or white light.

11. The liquid crystal display device according to claim 8, wherein the area of the fifth pixel is equal to the area of the sixth pixel.

12. A liquid crystal display device comprising:
a first display panel that displays a color image, the first display panel including a plurality of transmission sections each of which transmits light having a predetermined color; and
a second display panel that displays a black-and-white image, wherein
each of the first display panel and the second display panel includes a plurality of pixels, the plurality of pixels being defined by two source lines adjacent to each other and two gate lines adjacent to each other in plan view,
the plurality of pixels of the first display panel include a first pixel corresponding to a first transmission section transmitting light having first color, a second pixel corresponding to a second transmission section transmitting light having second color, a third pixel corresponding to a third transmission section transmitting light having third color, and a fourth pixel corresponding to a fourth transmission section transmitting light having fourth color,
a first pixel group including the two first pixels and the two second pixels and a second pixel group including the two third pixels and the two fourth pixels are arrayed adjacent to each other, and
the plurality of pixels of the second display panel include a fifth pixel overlapping the first pixel group and a sixth pixel overlapping the second pixel group.

13. The liquid crystal display device according to claim 12, wherein the area of the fifth pixel is equal to the area of the sixth pixel.

14. A liquid crystal display device comprising:
a first display panel that displays a color image, the first display panel including a plurality of transmission sections each of which transmits light having a predetermined color; and a second display panel that displays a black-and-white image, wherein
each of the first display panel and the second display panel includes a plurality of pixels, the plurality of pixels being defined by two source lines adjacent to each other and two gate lines adjacent to each other in plan view,
the plurality of pixels of the first display panel include a first pixel corresponding to a first transmission section transmitting light having first color, a second pixel corresponding to a second transmission section transmitting light having second color, and a third pixel corresponding to a third transmission section transmitting light having third color,
the plurality of pixels of the second display panel include a fourth pixel and a fifth pixel, the fourth pixel overlapping the first pixel while not overlapping the second pixel and the third pixel, the fifth pixel overlapping the second pixel and the third pixel while not overlapping the first pixel,
the first display panel further includes a sixth pixel corresponding to a fourth transmission section transmitting light having fourth color,
the first transmission section transmits white light,
the fourth pixel overlaps the first pixel while not overlapping the second pixel, the third pixel, and the sixth pixel, and
the fifth pixel overlaps the second pixel, the third pixel, and the sixth pixel while not overlapping the first pixel.

15. A liquid crystal display device comprising:
a first display panel that displays a color image, the first display panel including a plurality of transmission sections each of which transmits light having a predetermined color; and
a second display panel that displays a black-and-white image, wherein
each of the first display panel and the second display panel includes a plurality of pixels, the plurality of pixels being defined by two source lines adjacent to each other and two gate lines adjacent to each other in plan view,
the plurality of pixels of the first display panel include a first pixel corresponding to a first transmission section transmitting light having first color, a second pixel corresponding to a second transmission section transmitting light having second color, and a third pixel corresponding to a third transmission section transmitting light having third color, and
the plurality of pixels of the second display panel include a fourth pixel and a fifth pixel, the fourth pixel overlapping the first pixel while not overlapping the second pixel and the third pixel, the fifth pixel overlapping the second pixel and the third pixel while not overlapping the first pixel,
the first display panel further includes a sixth pixel corresponding to a fourth transmission section transmitting light having fourth color,
the first transmission section transmits green light,
the fourth transmission section transmits white light,
the fourth pixel overlaps the first pixel and the sixth pixel while not overlapping the second pixel and the third pixel, and
the fifth pixel overlaps the second pixel and the third pixel while not overlapping the first pixel and the sixth pixel.

* * * * *